United States Patent
Hagbi et al.

(10) Patent No.: US 9,824,495 B2
(45) Date of Patent: Nov. 21, 2017

(54) METHOD AND SYSTEM FOR COMPOSITING AN AUGMENTED REALITY SCENE

(75) Inventors: Netanel Hagbi, Be'er Sheva (IL); Oriel Y. Bergig, D.N. Lachis (IL); Jihad A. Elsana, Lakia (IL)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 13/063,724

(22) PCT Filed: Sep. 13, 2009

(86) PCT No.: PCT/IL2009/000890
§ 371 (c)(1),
(2), (4) Date: Dec. 9, 2011

(87) PCT Pub. No.: WO2010/029553
PCT Pub. Date: Mar. 18, 2010

(65) Prior Publication Data
US 2012/0069051 A1    Mar. 22, 2012

Related U.S. Application Data

(60) Provisional application No. 61/095,989, filed on Sep. 11, 2008.

(51) Int. Cl.
*G09G 5/00* (2006.01)
*G06T 19/00* (2011.01)
(52) U.S. Cl.
CPC .................. *G06T 19/006* (2013.01)
(58) Field of Classification Search
CPC .............. G06T 19/006; G06T 19/00

USPC ......................................... 345/633
See application file for complete search history.

(56) References Cited

U.S. PATENT DOCUMENTS

| 7,212,202 | B2* | 5/2007 | Weaver ..................... 345/420 |
| 7,987,079 | B2* | 7/2011 | Billinghurst et al. ........... 703/7 |
| 2001/0034668 | A1* | 10/2001 | Whitworth ..................... 705/27 |
| 2001/0043219 | A1* | 11/2001 | Robotham et al. .......... 345/474 |
| 2002/0010655 | A1* | 1/2002 | Kjallstrom .................... 705/27 |
| 2002/0021297 | A1* | 2/2002 | Weaver ........................ 345/420 |

(Continued)

OTHER PUBLICATIONS

Jun Park, Cheol-Su Lim: Mixed Reality Based Interactive 3D Story Composition Tool. TIDSE 2006: 181-186.*

Primary Examiner — Jin Ge
(74) Attorney, Agent, or Firm — Blank Rome LLP

(57) ABSTRACT

Disclosed are systems and methods for compositing an augmented reality scene, the methods including the steps of extracting, by an extraction component into a memory of a data-processing machine, at least one object from a real-world image detected by a sensing device; geometrically reconstructing at least one virtual model from at least one object; and compositing AR content from at least one virtual model in order to augment the AR content on the real-world image, thereby creating AR scene. Preferably, the method further includes; extracting at least one annotation from the real-world image into the memory of the data-processing machine for modifying at least one virtual model according to at least one annotation. Preferably, the method further includes: interacting with AR scene by modifying AR content based on modification of at least one object and/or at least one annotation in the real-world image.

37 Claims, 12 Drawing Sheets

(56) References Cited

U.S. PATENT DOCUMENTS

| | | | |
|---|---|---|---|
| 2002/0191862 A1* | 12/2002 | Neumann et al. | 382/284 |
| 2003/0062675 A1 | 4/2003 | Noro et al. | 273/237 |
| 2003/0080978 A1* | 5/2003 | Navab et al. | 345/633 |
| 2003/0179218 A1* | 9/2003 | Martins et al. | 345/633 |
| 2003/0219149 A1 | 11/2003 | Vailaya et al. | 382/128 |
| 2004/0131232 A1 | 7/2004 | Maisner et al. | 382/103 |
| 2007/0098234 A1* | 5/2007 | Fiala | 382/120 |
| 2007/0124215 A1* | 5/2007 | Simmons | 705/27 |
| 2007/0130020 A1* | 6/2007 | Paolini | 705/26 |
| 2007/0143082 A1* | 6/2007 | Degnan | 703/1 |
| 2007/0273644 A1 | 11/2007 | Natucci | 345/156 |
| 2008/0285854 A1* | 11/2008 | Kotake et al. | 382/190 |
| 2009/0089186 A1* | 4/2009 | Paolini | 705/27 |
| 2009/0167787 A1* | 7/2009 | Bathiche et al. | 345/633 |
| 2009/0322671 A1* | 12/2009 | Scott et al. | 345/156 |
| 2010/0048290 A1* | 2/2010 | Baseley et al. | 463/25 |
| 2010/0060632 A1* | 3/2010 | Lefevre et al. | 345/419 |
| 2011/0055746 A1* | 3/2011 | Mantovani et al. | 715/771 |

\* cited by examiner

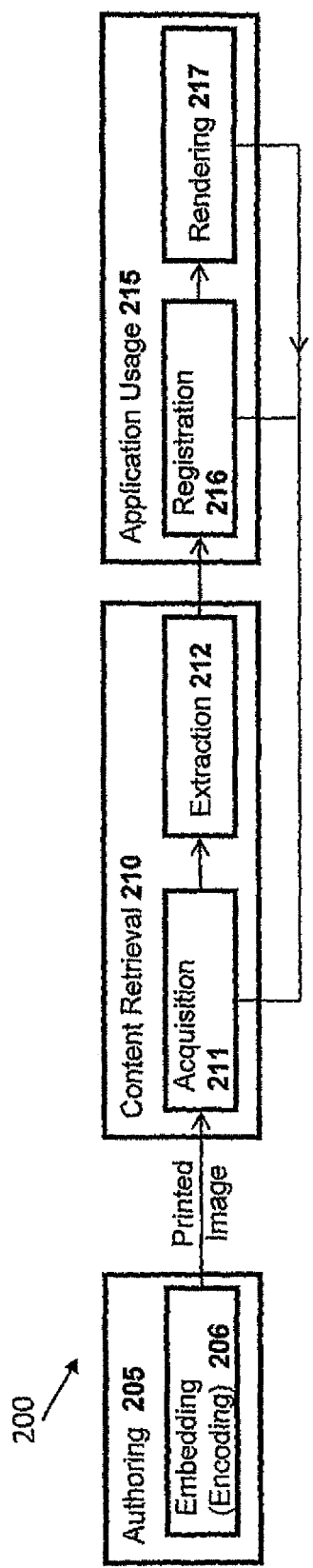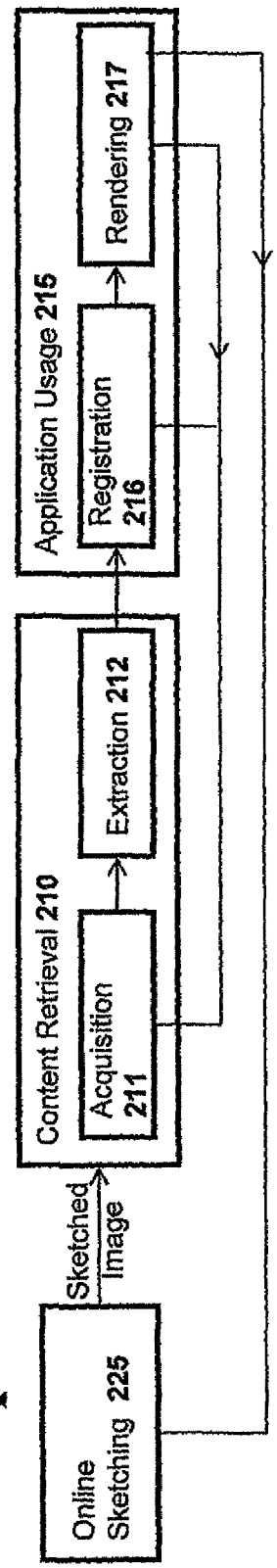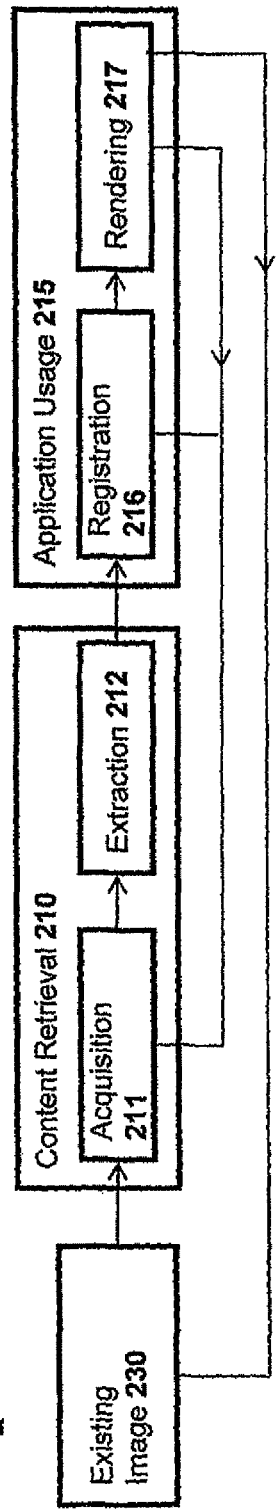

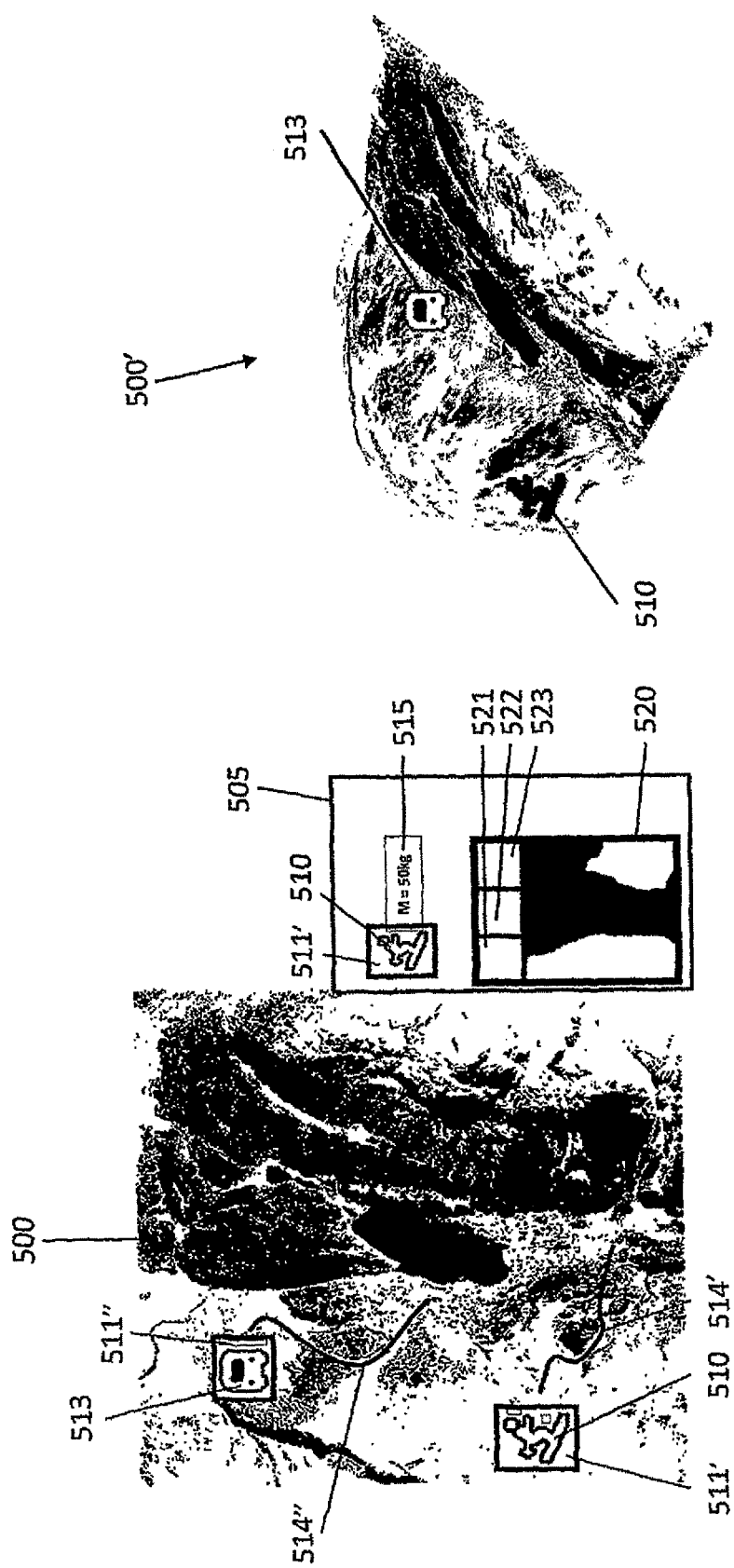

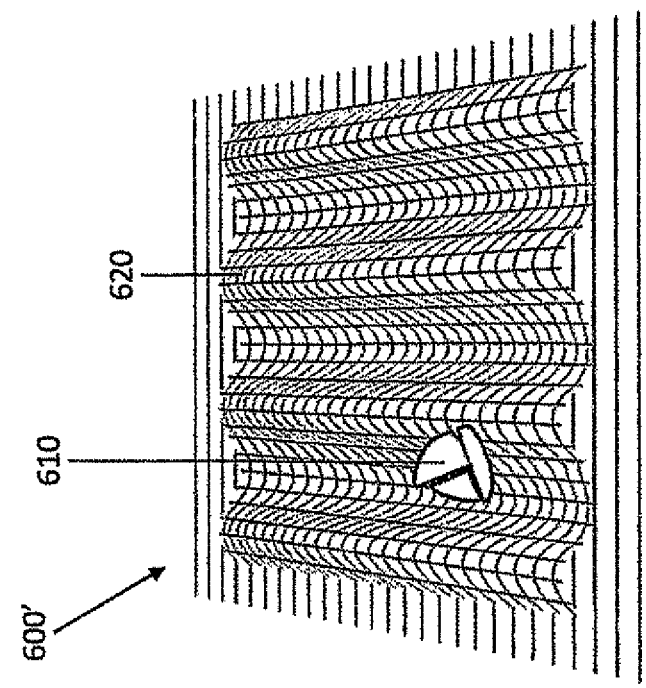
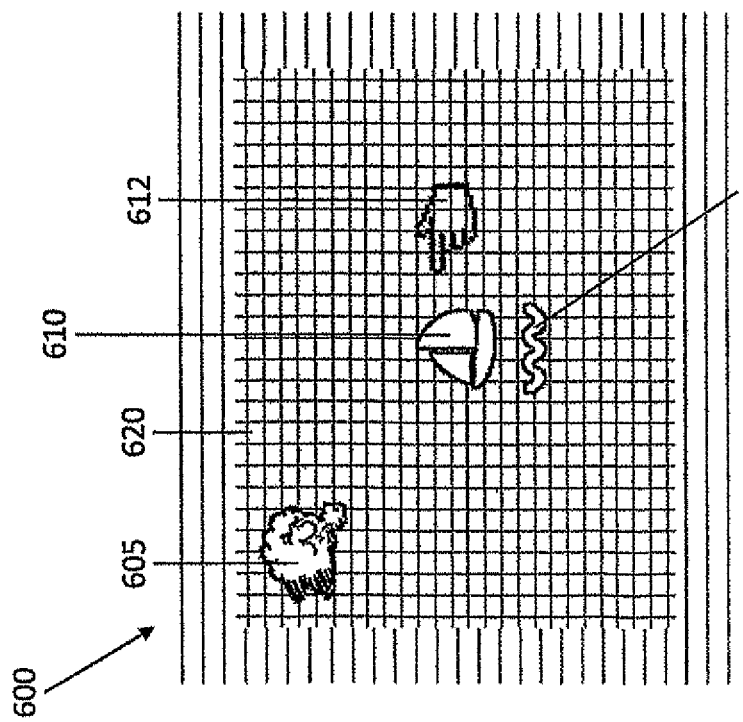

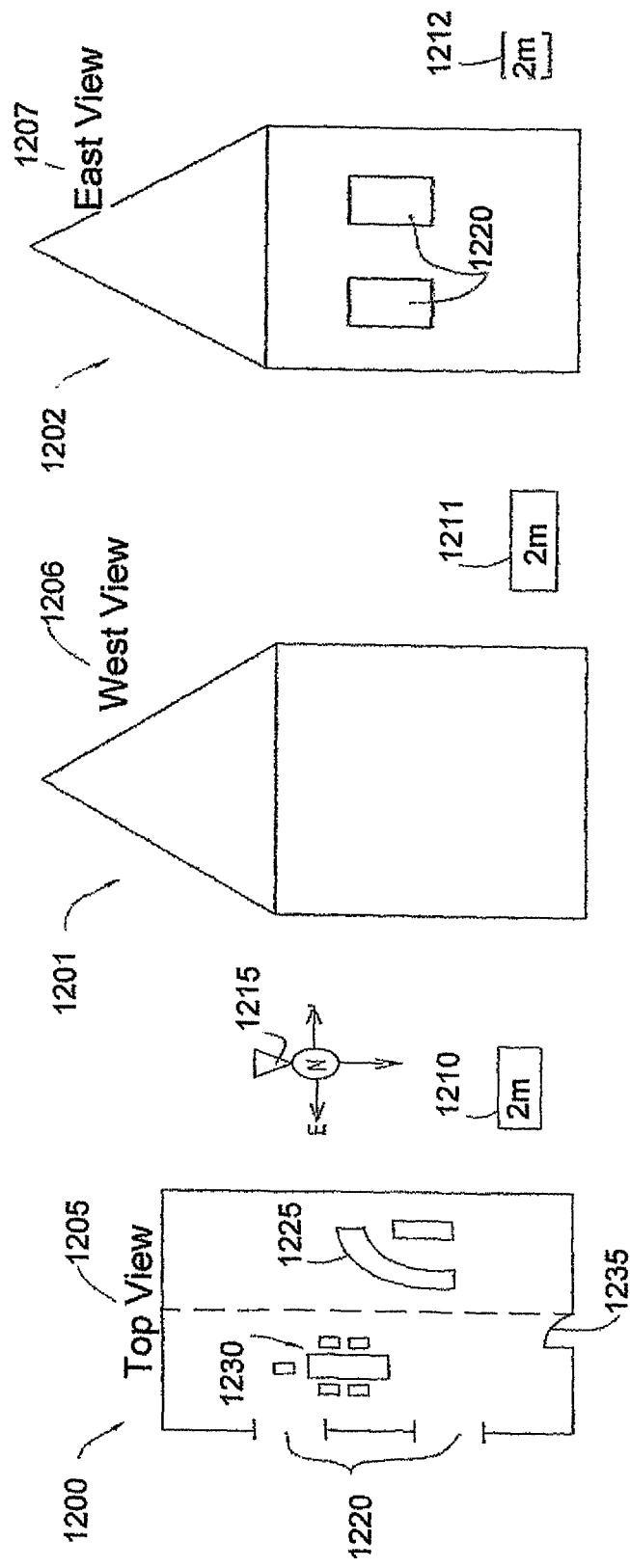

METHOD AND SYSTEM FOR COMPOSITING AN AUGMENTED REALITY SCENE

This patent application claims priority to U.S. Provisional Patent Application No. 61/095,989, filed Sep. 11, 2008, which is hereby incorporated by reference in its entirety.

FIELD OF THE INVENTION

The present invention relates to the Augmented Reality (AR) field. More particularly, the present invention relates to a method and system for compositing an AR scene from AR content which is embedded within an image (e.g., a print, a hand sketch), according to one or more rules, thereby substantially eliminating the need for downloading the AR content from a local or remote library/database, and allowing content modifications by sketching on the image.

Definitions, Acronyms and Abbreviations

Throughout this specification, the following definitions are employed:

Augmented Reality (AR): refers to the merging of virtual worlds into of the real world to produce new environments and visualizations, where physical and digital objects coexist and interact in real time. An augmented reality system maintains an AR scene and renders it on images of the real world in real time. Generally, the AR scene is designed to enhance the user's perception of the real-world, who can see it or interact with its virtual content. The AR Scene is registered to the real-world scene in a 3-dimensional (3D) manner, AR Scene: refers to digital information that represents visual content to be registered and rendered on top of images of the real world in real time. An AR scene can include of different kinds of AR content. The AR scene may include dynamic information as well, such as animation and simulation properties, which may affect the appearance of the AR content when rendered.

AR content: refers to digital information customized to be presented on a view of the real world. This information may be virtual models, text, sound, etc.

Virtual model: A digital geometric description of a spatial entity. The most common examples of virtual models are those created in 3D space for the purpose of visualization. A virtual model fundamentally includes of geometric structure. It usually also includes additional properties such as texture, color, material, position, and rotation, Connected Components Analysis/Labeling: is an operation for scantling an image and grouping its pixels into components, based on some form of connectivity.

Morphological Operations: are related to mathematical morphology, which is a theoretical approach to multi-dimensional digital signal analysis or image analysis based on shape.

Projective Transformation: is a linear transformation in homogeneous coordinates, which may be used to describe the relation between the poses of elements in the world and their poses from the observer's point of view.

Registration: In augmented reality, (vision-based) registration involves determining the position and orientation of a sensing device (e.g., a camera) with respect to the real-world or to a specific object within it in order to align AR content to the coordinate system of the real world or to a specific object within it.

Template Matching: is a technique in Digital Image Processing (DIP) for determining portions of an image that match a predefined template image.

BACKGROUND OF THE INVENTION

The past decade has been characterized by significant development and research in AR, AR content may, include for example, of 3D virtual models, which can be created using modeling software (application). According to prior art, the virtual content (such as AR content) is usually stored within a database (library) or model file, and is fetched by the AR system for rendering. Hence, according to the prior art, the AR content is digitally stored, and any interaction with it, such as editing, requires using dedicated computer software.

Content libraries/databases in AR systems are commonly maintained either locally on the augmenting device, or remotely on a database server. Updating local libraries on user devices is a relatively complicated task (especially if the devices are distributed between a large number of users). On the other hand, updating remote libraries (databases) is a relatively simple and centralized task, yet it requires connecting to a data network, such as the Internet or a cellular network. For example, it is supposed that a user points a camera of his cellular phone, on which an advertising AR application is installed, to an image printed in a newspaper. Then, the user observes a virtual scene containing one or more AR models, which are fetched from a remote database, superimposed over the printed image. For this purpose, according to the prior art, in order to download the AR content the user can point his cellular phone camera to a pattern or a barcode in the newspaper that encodes an index to the corresponding AR content to be downloaded. After that, the advertising AR application (installed on his cellular phone) connects to a remote database for downloading the AR, content according to the index. Therefore, according to the above, a user takes an active role in retrieving the AR contents. In addition the user may not be able to modify the content since the models compositing the AR scene are hard-coded in the database. The interaction with the models is also hard-coded in the database or even in the application itself.

Further, according to the prior art, the AR content can be digitally created by dedicated 3D modeling software. Such virtual content creation process usually requires relatively highly skilled content creators. Also, the 3D models have to be designed, as do their behaviors (for example, their time-dependent animation).

Also, according to the prior art, barcodes are widely used as a vision-based mechanism for identification, and can contain relatively complicated information. For example, the Gameboy® product of the Nintendo® company (located in United States), uses electronic cards with barcodes, wherein a complete game can be encoded within a barcode. Each individual electronic card has enough memory space to digitally encode a complete mini-game. Barcodes can also be used to identify a remote source of content (for example, barcodes can encode web page addresses). When the barcode is scanned by means of a cellular phone, the remote source of content is accessed over the cellular network. Although barcodes usually appear as a collection of black dots or lines, images can be incorporated into the barcodes in order to make them visually pleasant, as shown on FIG. 1A (incorporating photo 105 of a man's face). The barcode can be, for example, a dynamic 4D barcode, allowing the transmission of data to a mobile device (e.g., cellular phone 120) by providing a stream of barcode images, as illustrated in FIG. 1B.

Moreover, according to the prior art, in computer vision-based AR systems, visual markers are commonly used. The markers are usually used for: (1) identifying the AR content that should be augmented in a real-world scene; and (2) performing registration, thereby determining camera location relative to real objects within the real-world scene. For example, ARToolKit®, a software library for building AR applications developed and maintained by Human Interface Technology (HIT) Laboratory, University of Washington, USA, uses square fiducial markers (as illustrated on FIG. 1C). In addition, in the AR PlayStation® game titled "The Eye of Judgment" (http://www.eyeofjudgment.com/), cards are used to identify models and actions that can be performed: the cards are placed on a tracked board and their appearance reflects the content they identify.

It should also be noted that according to the prior art, several methods exist for interpreting relatively rich content from symbols, and more generally, from visual languages. Some visual languages are understandable to people without any computer system. For example, Pictography is the expression of words and ideas through standard languages that omit unnecessary details, e.g., icons, road signs, and Chinese characters. Visual languages are also common in cartography: non-spatial features are commonly described by legends, and spatial information, such as terrain topography or temperature is commonly described using color scales. It should be noted that a sketched 3D drawing (e.g., a perspective or isometric sketch of a cube) is also based on a visual language that is understandable to people; people who see such a perspective sketch of the cube, can relatively easily interpret it as the corresponding 3D object.

In addition, it should be noted that different approaches have been described in the literature for analyzing graphical annotations. For example, mathematical and physical laws can be automatically interpreted.

Therefore, there is a need in the prior art to provide AR method and system, wherein AR content is embedded within an image (e.g., a sketch) by eliminating the need for downloading the AR content from a local or remote library/database, and allowing interaction with the embedded content by hand sketching on the image; i.e., there is a need to provide a convenient and efficient way to generate AR content without maintaining a data content library/database, thereby extracting virtual model geometry, texture and behavior substantially directly from the image. For a better understanding of, and interaction with the embedded content there is a need for the content to employ dual perception. Dual perception means that the embedded AR content is visually understandable also without using any AR system. Furthermore, there is a need to provide a way to interact with AR content to be augmented by enabling editing the AR content (e.g., by sketching), while displaying it to a user, in substantially real-time.

SUMMARY OF THE INVENTION

The present invention relates to a method and system for compositing an AR scene, wherein AR content is embedded within an image (e.g., a sketch), according to one or more rules, thereby substantially eliminating the need for downloading the AR content from a local or remote library/database.

Therefore, according to the present invention, there is provided for the first time a system for compositing an AR scene, the system including: (a) an extraction component, operationally connected to a sensing device for capturing a real-world image, configured for: (i) extracting at least one object from the real-world image into a memory of a data-processing machine; (ii) geometrically reconstructing at least one virtual model from at least one object; and (iii) compositing AR content from at least one virtual model in order to augment the AR content on the real-world image, thereby creating the AR scene.

Preferably, the extraction component is further configured for: (iv) extracting at least one annotation from the real-world image into the memory of the data-processing machine for modifying at least one virtual model according to at least one annotation.

Preferably, the extracting is performed independently of a predefined content repository.

Preferably, the real-world image includes at least one image type selected from the group consisting of a printed image, a hand-sketched image, a hand-drawn image, a sprayed image, an image displayed on a screen, an image projected on a surface, a weaved image, a carved-surface image, and an engraved-surface image.

Preferably, the real-world image includes at least two correlated annotations for modifying an effect of other annotations.

Preferably, the real-world image includes a legend having at least one item selected from the group consisting of: an object referring to at least one image object, an annotation referring to at least one image annotation, an annotation referring to at least one object, and at least two correlated annotations referring to at least one object.

Preferably, at least one object includes the entirety of the real-world image.

Preferably, the extraction component includes at least one functional component selected from the group consisting of an object-extractor component, a geometry-analysis component, a modeling-cues-analysis component, an animation-analysis component, a space-warp-analysis component, a physical-property-analysis component, a user-interaction-analysis component, an inter-object-connection-analysis component, a mesh-generation component, a texture-generation component, and an object-factory component.

Preferably, the extraction component is further configured for: (iv) interacting with the AR scene by modifying the AR content based on modification of at least one object and/or at least one annotation in the real-world image.

According to the present invention, there is provided for the first time a method for compositing an AR scene, the method including the steps of (a) extracting, by an extraction component into a memory of a data-processing machine, at least one object from a real-world image detected by a sensing device; (b) geometrically reconstructing at least one virtual model from at least one object; and (c) compositing AR content from at least one virtual model in order to augment the AR content on the real-world image, thereby creating the AR scene.

Preferably, the method further includes the step of (d) extracting at least one annotation from the real-world image into the memory of the data-processing machine for modifying at least one virtual model according to at least one annotation.

Preferably, the step of extracting is performed independently of a predefined content repository.

Preferably, the real-world image includes a legend having at least one item selected from the group consisting of an object referring to at least one image object, an annotation referring to at least one image annotation, an annotation referring to at least one object, and at least two correlated annotations referring to at least one object.

Preferably, the method further includes the step of: (d) interacting with the AR scene by modifying the AR content based on modification of at least one object and/or at least one annotation in the real-world image.

According to the present invention, there is provided for the first time a computer-readable storage medium having computer-readable code embodied on the computer-readable storage medium, the computer-readable cede including: (a) program code for extracting, by an extraction component into a memory of a data-processing machine, at least one object from a real-world image detected by a sensing device; (b) program code for geometrically reconstructing at least one virtual model from at least one object; and (c) program code for compositing AR content from at least one virtual model in order to augment the AR content on the real-world image, thereby creating the AR scene.

These and further embodiments will be apparent from the detailed description and examples that follow.

BRIEF DESCRIPTION OF THE DRAWINGS

In order to understand the invention and to see how it may be carried out in practice, various embodiments of the invention will now be described by way of non-limiting examples only, with reference to the accompanying drawings, in which:

FIG. 2A is a schematic block diagram of an augmented reality system based on the presented In-Place Augmented Reality (IPAR) approach, according to an embodiment of the present invention;

FIG. 2B is a schematic block diagram of an AR system based on the presented In-Place Augmented Reality approach, according to another embodiment of the present invention;

FIG. 2C is a schematic block diagram of an AR system based on the presented In-Place Augmented Reality approach, according to still another embodiment of the present invention;

FIG. 4A is a sample map of a ski site, such as Saint Moritz ski site in Switzerland, comprising embedded AR content based on the presented In-Place Augmented Reality approach, according to an embodiment of the present invention;

FIG. 4B is a corresponding AR scene composited based on the sample ski site map, according to an embodiment of the present invention;

FIG. 5A is a sample image of an interactive ocean artwork, based on the presented In-Place Augmented Reality approach, according to an embodiment of the present invention;

FIG. 5B is a corresponding AR scene composited based on the interactive ocean artwork, according to an embodiment of the present invention;

FIGS. 12A to 12C are sample sketches of multiple views of an architectural building plan, comprising embedded AR content to be displayed in a 3D AR scene, based on the presented In-Place Augmented Reality approach, according to an embodiment of the present invention.

Figure 1C:
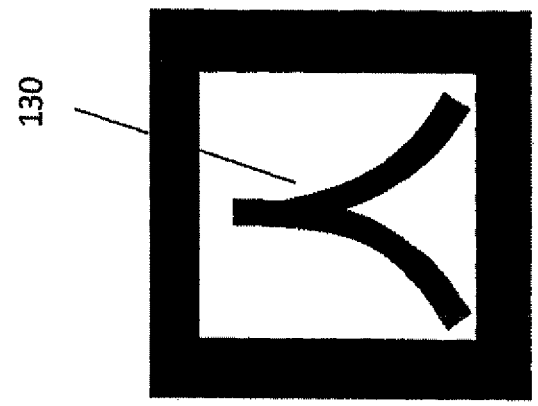
FIG. 1C is a sample illustration of a square fiducial marker for determining/calculating camera position in space relative to the marker, while the pattern inside the square is used to specify which virtual model should be retrieved from the library, according to the prior art.
Figure 1B:
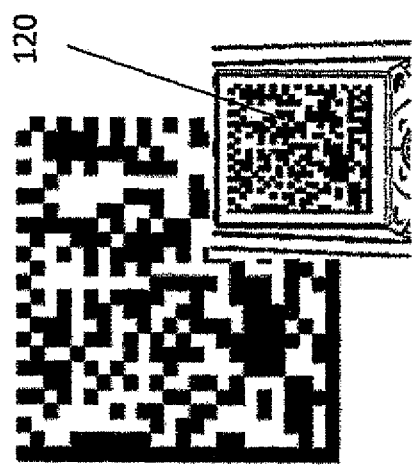
FIG. 1B is a sample illustration of a dynamic 4D barcode, allowing transmitting data to a mobile device by providing a stream of barcode images, according to the prior art.
Figure 1A:
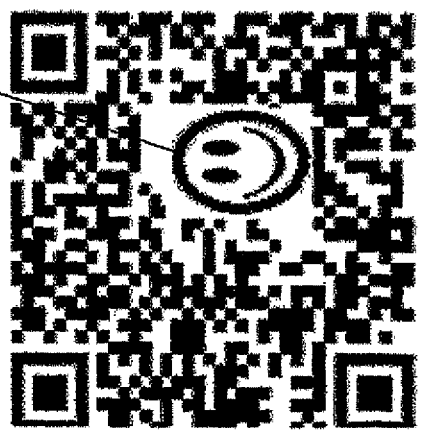
FIG. 1A is a sample illustration of a barcode, containing predefined information, according to the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE EMBODIMENTS

In the following detailed description, numerous specific details are set forth in order to provide a thorough understanding of the invention. However, it will be understood by those skilled in the art that the present invention may be practiced without these specific details. In other instances, well-known methods, systems, procedures, units, components, and the like have not been described in detail so as not to obscure the present invention.

According to the prior art, in conventional augmented reality applications, virtual models are created by artists and stored in a local library (within digital files) or in a remote database. At runtime, these models are retrieved from the library, registered, and rendered onto the scene, appearing to overlay the real-world content. The trigger in the real-world content that causes this virtual content retrieval to commence is commonly an image or marker that has to be printed by the user. This not only limits the usability of AR applications, but also turns the experience they provide from instant and straightforward into one that requires preparation by the user. According to an embodiment of the present invention, based on the presented In-Place Augmented Reality approach, the AR content, which includes of virtual models and their behaviors, is embedded in a real-world image (e.g., a sketch), captured by the augmented reality system, and then extracted from the captured image in order to be rendered back as AR content over the real-world image.

According to an embodiment of the present invention, the AR content is embedded substantially on the same place (e.g., on real printed paper), where it is augmented and, in turn, viewed by a user. This gives rise to the above term of "In-Place Augmented Reality" (IPAR), according to an embodiment of the present invention. According to another embodiment of the present invention, the AR content can be augmented in a predefined location within the image, or externally to the image, according to one or more predefined rules. Bach rule can be either indicative of at least one object provided within the image and/or can be related to an annotation describing a behavior or an action (e.g., animation, simulation) to be applied to at least one object. An IPAR system enables presenting AR content to a plurality of users independently of a content library/database. Virtual models and their behaviors are embedded into an image as objects and their annotations, and substantially no library/database is required to store them. Also, according to an embodiment of the present invention, the embedded AR content exhibits dual perception, meaning the real-world content is intuitive and understandable to users also without using the IPAR system. Furthermore, interaction is possible with the given AR content, e.g., by editing objects and annotations, and new AR content may be created by a user, for example, by sketching while the AR content is displayed to the user, substantially in real-time. According to an embodiment of the present invention, to make the embedded AR content identifiable in the image, the sketching has to follow one or more predefined rules of a visual language. One of these rules can be, for example, sketching an object to be augmented, in a specific color/grey-level. The IPAR system can be designed and maintained as a general system for processing and displaying any amount of AR content as long the content consistently follows a visual language. Furthermore, since the content does not have to be retrieved by any communication means, the number of concurrent users substantially does not affect the operation of the presented IPAR system. This is in contrast to the case where AR content is prepared in advance and stored on a remote database/library. Hence, the number of concurrent users is unlimited. According to a further embodiment of the present invention, the IPAR system can also function when no data network (e.g., the Internet, cellular network, etc.) can be used. According to a further embodiment of the present invention, the IPAR system can also waive the need to print or use pre-printed material since content can be created substantially in real time, e.g., by hand-sketching it from scratch.

FIG. 2A is a schematic block diagram of an augmented reality system 200 based on the presented In-Place Augmented Reality approach, according to an embodiment of the present invention. System 200 comprises three main stages: a) Authoring stage 205 having Embedding/Encoding sub-stage 206 for embedding AR content into a real-world image, according to a set of (visual language) predefined rules; b) Content Retrieval stage 210 having Acquisition sub-stage 211 for acquiring the image with the embedded AR content, and Extraction sub-stage 212 for extracting the embedded AR content from the acquired image; and c) Application Usage stage 215 having Registration sub-stage 216 for registering the extracted AR content, and Rendering sub-stage 217 for rendering the extracted AR content over the image. It should be noted that the image can be, for example, printed on real paper (or on any other substance, such as a shirt, canvas, poster, etc.), or displayed on a screen (such as a computer/mobile device or television screen).

According to an embodiment of the present invention, in Authoring stage 205 the AR content (being one or more virtual models and their behaviors, such as changes in the model texture, geometry, location) is embedded into an image by embedding corresponding objects, and optionally their annotations (cues), which represent the AR content within the image. The set of predefined rules enables IPAR system 200 to define how to extract the AR content from the image. According to an embodiment of the present invention, determining one or more objects within the image, can be applied by marking an object with an identifying feature, such as a predefined background color (e.g., green color), or by following other rules that determine what is considered to be an object (e.g., according to size, position, connectivity). Also, an object may be superimposed on area that can be used as texture, according to a predefined rule. In this case, the texture that is covered by the object can be in-painted during AR presentation to the user if the object is moved from its original location during the AR presentation. It should be noted that a composited AR scene may contain a background image, which in turn can also be an object. In this case, the embedding of the background image may not be marked by any identifying feature.

At Content Retrieval stage 210, the image with the embedded AR content is acquired (at Acquisition sub-step 211) by means of a conventional camera (e.g., a web camera, mobile device camera), and then the embedded AR content is extracted (at Extraction sub-step 212) from the image by means of a dedicated AR application that receives the acquired image from the camera. According to an embodiment of the present invention, the extraction is performed according to a set of predefined rules (e.g., objects are provided with a green background, animation paths are red color curves). According to an embodiment of the present invention, the rules, which derive the appearance of the image (e.g., by defining the cues/annotations that can be used) is the syntax of a visual language. The rule interpretation is a semantic element of this syntax; generally, each rule defines how to embed certain AR content into the image and therefore how to extract it and geometrically reconstruct it, thereby enabling compositing an AR scene. The image containing the embedded AR content is a spatial grouping of the syntax, which corresponds to the AR scene. It should be noted that each AR scene can be composited from more than one image. Also, the rules can be grouped into families, such as geometric rules, texture rules, animation rules, and so on.

At Application Usage stage 215, the extracted AR content (i.e., the extracted and geometrically reconstructed virtual model(s) and their behavior(s)) is registered and rendered over the real-world image by means of an AR application. The AR application can be installed, for example, on a user's mobile device (e.g., a cellular phone, PDA (Personal Digital Assistant)). In such case, the user can also acquire the image with the embedded AR content at Acquisition sub-stage 211 by means of his mobile device camera, eliminating the need to have additional equipment. Then, a user is presented with a composited AR scene, wherein the AR content is displayed over the real-world image. Such composited AR scene can be viewed on a screen of the mobile device, on a computer/television screen, or on a head-mounted display, for example.

According to an embodiment of the present invention, before (or during) rendering an AR scene, various visual effects can be added to it (such as lighting, shininess, blending, smoothing, and so on), which are embedded within the image by using the appropriate annotations.

According to an embodiment of the present invention, the IPAR approach enables extracting AR content (virtual models and their behaviors) from an image that contains objects and annotations that represent them, after capturing the image by means of IPAR system 200 at Acquisition sub-stage 211. It should be noted that the behavior of a virtual model refers to the way the virtual model acts substantially in real-time, and to the way it is displayed to the user. The object is a representation of the virtual model, while annotations (e.g., an animation path) of the object represent virtual model behaviors. For example, the animation path for an object can be represented by a continuous curve drawn on the image, which is printed on real paper. Further, an order for presenting virtual models to a user in a composited AR scene can be predefined according to their desired appearance, and therefore objects (that correspond to the virtual models) are arranged according to this order. According to an embodiment of the present invention, the set of rules comprises, for example, the following rules: objects within the image are drawn in a predefined color/grey-level or are surrounded by a predefined (color/grayscale) background; and annotations (cues) are predefined symbols, enabling them to be relatively easily identifiable and extractable by means of IPAR system 200. To associate an annotation with an object, the annotation can be placed, for example, in proximity to the object.

According to another embodiment of the present invention, before the image with the embedded AR content is analyzed (e.g., after being acquired by means of an imaging device, such as a mobile device camera), the image can be corrected by applying to it a projective transformation. For example, if the image is surrounded by means of a black frame, then the projective transformation matrix can be calculated according to the vertices of the black frame by using conventional techniques. In addition, to overcome lighting differences within the image and reduce the effect of relatively low camera quality, image enhancement procedures (e.g., color correction, super sampling) can be further applied to the captured image. Also, in order to deal with color distortion, predefined reference color shapes (e.g., a red square, green square) can be added to the image. Such reference color shapes can be added to a predefined location in the image (e.g., into an image "legend"). Then, through the image acquisition, each pixel color is interpolated according to these reference colors. It should be noted that acquisition of images by means of a camera can be performed by taking one or more still pictures of the same real-world environment, or by shooting a video clip. In the case where the real-world environment is captured more than once (obtaining more than one still image), further processing of the real-world environment is performed, according to conventional techniques in the field (e.g., techniques for creating panoramic images, or restoring satellite images).

According to an embodiment of the present invention, performing the above preprocessing of the captured image before executing Extraction sub-stage 212 is used to prepare the image for extraction of the embedded AR content, which is represented within the image by means of one or more objects with corresponding cues/annotations. For this, an image that is shot, for example by video, can be further brought to a planar state, making the objects relatively easy to locate within the image. If required, new images with enhanced features can be generated from the captured image. For example, a new image can be generated in which green color is made greener to make it easily identifiable, or in which green pixels are set as binary "1's" and other color pixels are set as binary "0's". Further, morphological operations may be applied to annotations (which may define the behavior of an object, such as moving the object or morphing the object geometry or texture) to make the cues more prominent.

According to another embodiment of the present invention, when extracting the embedded AR content from the image, Embedding 206 process (FIG. 2A) may be logically reversed. First, the acquired (and optionally enhanced) image is analyzed, and its objects, along with their corresponding annotations, are interpreted by means of IPAR system 200 in order to yield a collection of virtual models with their corresponding behaviors. Extraction stage 212 involves the following operations: a) locating objects and geometrically reconstructing corresponding virtual models (including generating virtual model geometry and texture) from the objects; b) identifying annotations/cues related to predefined behaviors of the virtual models; and c) assigning the predefined behaviors to the virtual models, accordingly.

According to another embodiment of the present invention, annotations (cues) also have an identifying feature (e.g., red color) that makes them relatively easy to extract from the image. So, for identifying and preserving annotations, binarization of the image can also be performed. For annotations whose shape is fixed and predefined by means of one or more rules of IPAR system 200, then such shape is defined as a template, and normalized cross-correlation template matching can then be performed between a set of predefined annotations templates and the binary image for determining the location of each annotation within the acquired (captured) image. Then, each identified annotation is assigned to its nearest object by using, for example, conventional Euclidean distance transform of the object and annotation. Once the annotations are extracted from the image, the predefined behaviors they represent are assigned to the corresponding extracted objects (and in turn, to the corresponding virtual models). For example, when a hand annotation that is associated to an object is identified, IPAR system 200 associates an operation of pressing a keyboard arrow to a movement of the specific virtual model, so that the object can be interactively manipulated by the user.

It should be noted that according to an embodiment of the present invention, animation paths can be continuous curves/lines, having a predefined color/grey-level (e.g., a red color). Therefore, animation paths can be represented by pixels that remain unidentified after previous steps (e.g., after the template matching). To extract animation paths (or any other line/curve), conventional morphological operations can be performed.

According to an embodiment of the present invention, at Application Usage stage 215, after the AR content (virtual models and their corresponding behaviors) has been reconstructed from the acquired real-world image, then substantially real-time augmentation and AR viewing can start. For each captured video frame/still image, virtual models are registered into the real-world image and rendered at sub-stages 216 and 217, respectively, according to conventional prior art techniques. For example, the registration can be performed by using the ARToolKit® marker-based registration package, with relatively slight modifications. Then, in Rendering sub-stage 217, the extracted virtual models are rendered into the image, and updated/modified according to their assigned behaviors. For example, the new position of a model is calculated at each frame, and then the object is transformed to the new position accordingly.

According to a further embodiment of the present invention, at least a portion of the predefined rules and/or at least a portion of the AR content (according to which a corresponding AR scene is composited and presented to a user) is stored within one or more of the following: a file that can be provided locally, for example, within a user's computer/mobile device (e.g., a cellular phone), on which the AR application that enables viewing the composited AR scene is installed; or a library/database, provided within a (remote) server over a data network (e.g., the Internet or a cellular network, to which the user's device connects).

FIG. 2B is a schematic block diagram of an augmented reality system 200 based on the presented In-Place Augmented Reality approach, according to another embodiment of the present invention. According to this embodiment, an image with AR content is sketched by hand on real paper, based on a set of predefined rules. It should be noted that the sketching can be done in real-time, without a need to perform embedding/encoding 206 (FIG. 2A) of the AR content in advance. This can be especially useful as an interaction technique in games or in educational applications, such as school/university educational applications allowing a pupil/student to sketch an image based on a set of predefined rules, and in parallel, or afterwards, see the desired AR content presented over the sketched image as a composited AR scene. The sketch can be observed by a user in 3D by using, for example, a mobile device.

It should be noted that according to an embodiment of the present invention, the user sketches a 2D projection of a 3D object on real paper (e.g. a cube), and then, at Application Usage stage 215; he observes his sketch in 3D on a screen, the sketch (image) being interpreted and presented in 3D environment on the same place it is sketched. According to this embodiment of the present invention, the user's sketch can be presented to him in 3D environment substantially in real-time, even if the user has not yet finished sketching.

It should be noted that according to another embodiment of the present invention, after performing Content Retrieval stage 210 and augmenting the extracted AR content on the image, the AR content can be either augmented substantially on the same place it was sketched/embedded within the image, or it may be augmented in a predefined location within the image or externally to the image, for compositing a corresponding AR scene. Furthermore, an already running AR scene may be introduced with new AR content by capturing, by means of an imaging device, additional AR content (represented by objects and/or annotations), and in turn augmenting the AR content and modifying the AR scene or compositing a new one. It should be noted that the AR scene can be composited by initially retrieving AR content from a local/remote database, and then introducing new AR content by means of IPAR system 200. For example, a game may contain a slider that is sliding on a terrain, according to one or more rules that are predefined and fetched from a database. Then, IPAR system 200 enables the user to add a hill to the terrain, according to one or more predefined rules, by placing a card with an embedded hill sketched on it within the real-world view of the camera. After that, the hill is captured and extracted, and a new hill virtual model is generated, for compositing a corresponding AR scene and displaying it on a screen. As a result, the slider can interact with the hill (e.g., by climbing on it), while the user is holding the card of the 2D hill in front of his camera. On the other hand, when the user removes the card from the camera field of view, the hill virtual model is detached from the card (the card displayed on the screen with the hill sketched on) and remains in the running AR scene.

According to an embodiment of the present invention, at the Content Retrieval stage 210 a hand-drawn or printed sketch is analyzed. Such analysis can comprise analyzing sketch lines, corners, curves, and other types of elements, considering the visual language used for the sketching, and considering errors in the sketch that may be unintentionally caused by the user during the sketching. Instead of sketching by hand, a sketch can be provided by projecting a 3D model by using computer software, or sketched in 2D by using computer software, such as Microsoft® Visio, which reduces sketching errors. It should be noted that according to another embodiment of the present invention, a sketch can be drawn such that the colors, styles (e.g., dotted style), thicknesses of its lines have specific meanings, as predefined by the set of rules. For example, in a wireframe model of a cube, rear lines that are occluded may be drawn using a different color. Furthermore, additional cues can be added that help interpreting the image. For example, the 3D coordinate system (X, Y, and Z axes) can be depicted in the sketch using three mows. Further, it should be noted that according to still another embodiment of the present invention, the sketch can comprise a 3D object that is composed of different parts. In such a case, the object may be decomposed to make the sketch interpretation easier. Decomposition rules may be added as cues to the sketch (e.g., as arrows, or using different line thickness, color).

FIG. 2C is a schematic block diagram of AR system 200 based on the presented In-Place Augmented Reality approach, according to still another embodiment of the present invention. According to this embodiment, the image 230 is an existing conventional image, and Embedding/Encoding sub-stage 206 (FIG. 2A) is skipped. It should be noted that the conventional image (e.g., sketch) may already comprise 3D cues (e.g., depth/height cues) that enable extraction and interpretation of a 3D AR scene (as, for example, shown in FIG. 7A).

According to another embodiment of the present invention, Embedding sub-stage 206 may involve the use of a dedicated compiler. In such case, an existing 3D image (e.g., generated by using 3D software, such as 3D Studio®), comprising objects (representing, for example, 3D models) and cues (annotations) that represent 3D models behavior, can be compiled to a corresponding 2D image that represents the 3D scene by embedding additional information (geometry, behavior and etc), according to set of predefined rules. Such rules can be related to a perspective projection of the 3D model from a view point that emphasizes cues for reconstructing the corresponding 3D geometry. For example, one rule can state that curved edges are drawn in a different identifying color from straight ones. According to another rule, an animation path near an object can indicate object behavior in time. Thus, the compiler can place (e.g., in proximity to the object) one or more annotations to describe the desired animation and/or to describe an object modifier (an operation to be applied on the object), etc. The compiler also "knows" how to correlate the object with its annotation. The compiler-generated image may be further edited in 2D on a computer screen. For example, the user may move an annotation to a different location within the image after it has been placed there by the compiler. The resulting 2D image can then be printed on real paper or displayed on a computer/mobile device screen to be further acquired by an imaging device (e.g., a web/cellular phone camera).

It should be noted that according to an embodiment of the present invention, a virtual model has geometry. Also, an annotation (cue) can be used to specify model behavior, providing additional information about the model, such as animation, user-interaction to be applied to the model, physical properties (e.g., an elastic force) to be used in a physical system simulation, etc.

In addition, it should be noted that according to an embodiment of the present invention, IPAR system 200 enables providing image dual perception to a user, i.e., AR content (virtual models and their behaviors) is encoded into an image in such a way that their embedded representations visually reflect the virtual models and their behaviors for a user also without using the IPAR system 200. Further, it should be noted that since AR content is embedded into a printed image (or into an image displayed on a screen), there is substantially no need to ask from a user (or from an AR application installed on a user's device) to send an identification code to the AR content provider for downloading the AR content. At the same time, content providers do not have to be concerned with securely distributing their copyrighted content electronically over a data network.

According to still another embodiment of the present invention, AR content library/database is not provided for retrieving AR content, since the AR content is extracted from the image at Extraction sub-stage 212. In turn, a communication infrastructure (such as a communication network like the Internet, a cellular network, etc.) is also not required.

It should be noted that, according to a further embodiment of the present invention the AR application (installed on a user's device, such as a cellular phone) may require using a local or remote database/library (or file). Consequently a data network connection (e.g., a cellular network connection) may be required for compositing AR scenes. For example, a portion of the AR content may be retrieved from a remote database/library or file. The index to such AR content may then appear as a part of a set of predefined rules to be used for extraction of the AR content. For another example, the predefined rules (rather than the AR content) are retrieved from a local or remote database/library.

Since an IPAR image with the embedded AR content (a printed image, or an image displayed on a computer/mobile device screen) has dual perception and visually reflects the embedded augmented contents to a user (i.e., the IPAR image is understandable also without using IPAR system 200), then a user's interaction with the IPAR image is natural and relatively easy, even without using an Augmented Reality application. For example, a user who sees a perspective sketch of a cube understands that it is a 3D cube without using any AR application.

According to the present invention, the presented In-Place Augmented Reality approach can be useful in a wide range of different domains. In education, for example, physics books can include figures of physical scenarios with embedded AR content, demonstrating the material discussed in lessons. Animation can be assigned to objects within the figures according to their properties, thereby allowing creating a composited AR scene accordingly, in the place where the figures are depicted in the book. Different figures may yield different AR scenes, all based on substantially the same set of predefined rules. For example, according to one predefined rule, a 3D object is marked with an identifying feature (e.g., a predefined color/grey-level), and is projected and embedded in a hand-drawn sketch; this in turn, enables relatively easy identification, extraction and reconstruction of the 3D geometry of the 3D object at Extraction sub-stage 212. For another example, the mass of the object can be marked by a number and a letter, e.g., M=4 kg, wherein "M" is a short for the mass, and "kg" is a short for the kilogram(s). Further, a physical oriented force (e.g., gravitational or elastic force) can be marked within the image (sketch) by an arrow, indicating the direction of the force, while the force intensity can be indicated by the length of the arrow. As a result, when a figure with embedded AR content is viewed by IPAR system 200 (for example, using a mobile device), it can be animated in accordance with the studied physical laws. In addition, students can interact with the figures by using the IPAR system 200, allowing them to modify different physical properties and see the effect substantially in real-time. Furthermore, the student can add AR content to an existing figure by sketching on it (e.g., sketching an additional physical force).

In geography, for still another example, maps provided in geography books can be interpreted by means of IPAR system 200, and then different map layers can be separated/added to the map. Further, more layers from additional sources such as cards, sketches on the map, and the like, can be acquired and integrated in the corresponding AR scene. According to an embodiment of the present invention, several layers can be blended together, creating a composited AR scene, wherein the layers are projected (embedded) back into the map within the geography book, or onto a graphical primitive, such as a sphere.

In advertising, for a further example, advertisers may create AR content for IPAR applications to be used with IPAR system 200, enabling them to have a relatively high level of flexibility and simplicity in distribution and maintenance of their AR advertisements, eliminating the need to publish a virtual content in addition to the printed advertisement.

Furthermore, in games, users may be able to create their own version of games. For example, one can modify the board of a given game and enjoy it interactively. For example, in a card game, one or more cards can be imaged, at the same time or separately. The objects and their corresponding behaviors (animation), which appears on the cards, can be interpreted accordingly, compositing and updating a corresponding AR scene. It should be noted that the objects on the cards can be printed, or they can be sketched projections of 2.5D or 3D virtual models with specific texture and behavior. Further, the AR scene may be rendered and displayed on the same place, i.e., on the one or more cards or on some spatial arrangement of the cards. In a board game, for another example, a board can be acquired and processed by means of IPAR system 200, and the printed/ sketched content on the board can be used to create a corresponding 3D AR scene. Also, additional cards may be used to add content. In a cube game (e.g., based on a tangible cube), for a further example, each face of the cube can be acquired and processed by means of IPAR system 200, interpreting its sketched or printed content, and then compositing a corresponding AR scene. Further, an interactive puzzle game where the pieces of the puzzle are acquired and processed by means of IPAR system 200, can be provided. Correctly placing the puzzle pieces together can generate AR scene to be rendered and displayed on the puzzle. The AR scene can be generated substantially directly from the images that are printed on the puzzle pieces, according to a set of predefined rules. For still another example, a virtual character in a game (e.g., a game character loaded from a file or database), may interact with the AR content provided by the user using IPAR system 200.

It should be noted according to a further embodiment of the present invention, since in a running AR application, the 3D spatial location of virtual models is known, as well as the 3D spatial location of tracked objects within the AR scene, hence, a user may refer to a virtual model by acquiring (by means of a sensing device) a tracked object next to the virtual model. For example, a user may sketch a 2D projection of a mountain, according to a set of predefined rules, and locate the sketched mountain next to a virtual character—actually, placing the object (mountain in this case) in space and seeing it next to a virtual character within the composited AR scene. In turn, this may cause the virtual character to slide or climb the extracted mountain model, after the it was extracted and generated. For another example, the user may acquire a specific texture (e.g., a clothing item) by means of a camera, which in turn, may cause the virtual character texture to be changed accordingly.

Figure 3:
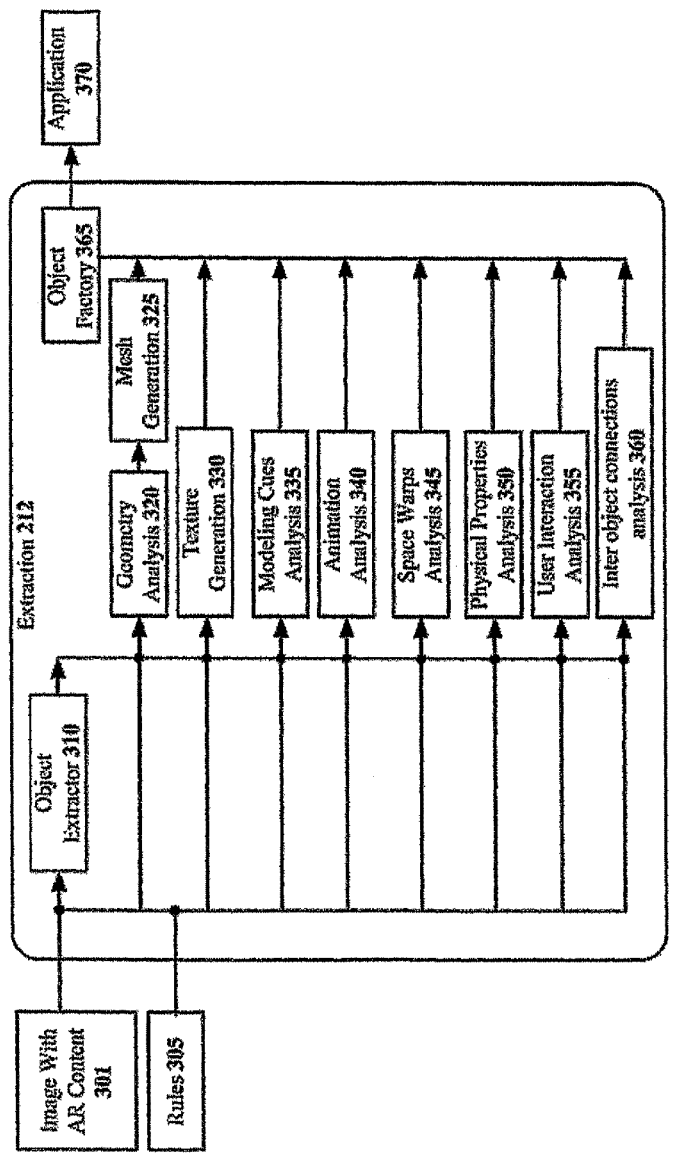
FIG. 3 is a block diagram of the Extraction sub-stage for determining and providing AR virtual models (represented by objects within the image) and their corresponding behavior (represented by annotations within the image) into the AR application for compositing an AR scene, and in turn, displaying it to a user at the Application Usage stage, according to an embodiment of the present invention.

FIG. 3 is a block diagram of Extraction sub-stage 212 for determining and providing AR virtual models (represented by objects within the image) and their corresponding behaviors (represented by annotations within the image) into AR application for compositing AR scene, and in turn, displaying it to a user at Application Usage stage 215 (FIG. 2A), according to an embodiment of the present invention. When extracting the embedded AR content from the image, Embedding/Encoding process 206 (FIG. 2A) is logically reversed. According to this embodiment, Extraction sub-stage 212 comprises the following software (and, optionally, hardware) components/units: Object Extractor software components 310 for extracting objects having predefined geometry and/or texture, the objects being related to virtual models, and extracting annotations that define behaviors of the virtual models; Geometry Analysis software component 320 for analyzing geometry (e.g., shape, size) of one or more extracted objects; Modeling Cues Analysis software component 335 for analyzing cues that modify the geometry of the one or more extracted objects (e.g., applying symmetry to a 2.5D model to make it become a 3D model, etc.); Animation Analysis software component 340 for analyzing animation applied to the one or more extracted objects; Space Warps Analysis software component 345 for analyzing space warps (e.g., wind, gravitation, etc.) to be applied to the one or more extracted objects; Physical Property Analysis software component 350 for analyzing physical properties (e.g., mass, velocity) of the one or more extracted objects; User Interaction Analysis software component 355 for analyzing which user interaction can be applied to the one or more extracted objects; Inter-Object Connection Analysis software component 360 for determining connections between objects (e.g., a connection between a rope and wheel, on which it should be rolling); Mesh Generation software component 325 for generating a mesh for each extracted object geometry (mesh is a collection of polygons that defines a specific model), the mesh to be used for enabling compositing a corresponding AR scene; Texture Generation software component 330 for generating texture for one or more extracted objects (e.g., performing in-painting, according to conventional in-painting techniques); and Object Factory software component 365 for receiving the properties of each extracted object (e.g., object geometry, texture, cues, animation paths), and outputting the object ready to be registered and rendered at Application Usage stage 215. It should be noted that Object Factory software component 365 may use conventional data structures and conventional tools for managing such data structures, for enabling compositing AR scene (for example, it may use a conventional Scene Graph data structure).

After image 301, which contains embedded AR content (e.g., either an image that is sketched or a printed image), is acquired by an imaging device and processed accordingly at Acquisition sub-stage 210 (FIG. 2A), it is inputted into Object Extractor software component 310 for further processing. Such further processing comprises identifying and extracting image layers, objects, cues/annotations, and any other required image properties. According to an embodiment of the present invention, Object Extractor 310 extracts image layers, which can be identified according to their predefined location or predefined cue/annotation provided within the image. As a result, Object Extractor 310 generates a collection (set) of images, each image representing a different layer. It should be noted that the image layers can appear one next to the other with a predefined symbol (e.g., a serial number) indicating their order. Alternatively, layer ordering can be inferred from the layers' spatial arrangement (e.g., the higher a layer is vertically positioned on an image Y-axis, the higher its serial number can be). Further, grouping/ungrouping of layers may be required according to predefined rules. Object Extractor 310 determines objects within the image, according to predefined features (defined by a set of rules 305), such as a color/grayscale of an object within the image, object texture characteristics (e.g., regularity), style/thickness of an object contour, symbols, locations of annotations within the image, and so on. Also, for identifying entire objects and their cues, Object Extractor 310 can use conventional connected components analysis techniques, conventional thresholding techniques and/or conventional morphological operations.

For example, the object to be extracted (and later augmented by means of IPAR system 200) can have an identifying feature (e.g., a green color contour) that identifies the object. Such an identifying feature is a rule for embedding, and in turn, for extracting an object from the image. In addition, Object Extractor 310 determines cues provided within the image, or near the image (e.g., within an image legend). Each cue can be assigned to a corresponding object for which it is provided, according to various parameters, such as distance of the cue from a corresponding object (e.g., the closest object is considered to be the one to which the cue is related); a geometric shape (e.g., a line) that connects the cue with a corresponding object; predefined position of the cue; similar appearance of both cue and its corresponding object (e.g., similar texture/color), etc.

According to an embodiment of the present invention, the cue (such as a line) can be interpreted in different ways according to its appearance meaning. For example, the thickness of a line of an annotation, which is to be assigned to a specific object, can be related to an order it will be assigned to the specific object. Hence, if two annotations have to be assigned to the same object, for example, the first annotation to be assigned can be is the one connected to the specific object by means of a thicker line. It should be noted that the cue can be further located inside an object, and hence assigned to the object. Further, a cue location inside the object can be important as it may point on an important feature of the object (such as object center). Further a correlation between objects and annotations (cues) can be of one or more following types: "one to one" (a single cue is related to a single object); "one to many" (a single object relates to two or more cues, or two or more cues are related to a single object); and "many to many" (two or more cues are related to two or more objects). These can be achieved, for example, by combining correspondence rules and grouping the rules. Further, the cue can be related to all objects within the image by the nature of the cue, as defined in a set of predefined rules 305 (e.g., a gravity cue) or by its location (for example, locating the cue in an image corner). In addition, it should be noted that cues and/or objects may be introduced into the AR scene in an online manner (e.g., sketched by a user, while the composited AR scene is being displayed to the user, i.e., while the AR application is running), in which case the cues/objects may be correlated with other models within the AR scene, according their relative position within the 3D AR scene (X,Y,Z coordinates). Finally, Object Extractor 310 generates a set of extracted objects and their corresponding cues, and outputs them to other software components for further processing.

It should be noted that according to an embodiment of the present invention, during Embedding sub-stage 206 or Online Sketching stage 225 (FIG. 210, different annotations applied to an object (e.g., animation, user interaction, modeling cue) can be grouped. The grouping can be performed according to proximity (smallest distance from each over), identifying feature, such as a square around the cues, and etc. Similarly, objects provided, within the image can also be grouped.

Further, according to another embodiment of the present invention, during Embedding sub-stage 206 or Online Sketching stage 225, objects can be given a non-accidental order, using their inherent features, their location, by analyzing (previously embedded) ordering annotations next to them, and so on. This ordering can be used to correlate objects and their annotations (e.g., the first annotation in the legend applies to the first object, the second to the second, etc.), or employ ordering of layers or perform any other operations, as defined by rules.

Geometry Analysis software component 320 analyzes the geometric structure of objects extracted from the image. The object can have, for example, 2D, 2.5D or 3D geometric structure. It should be noted that, when embedding an object (at Embedding sub-stage 206 or Online Sketching stage 225) into an image, various approaches can be used, such as using intensity/contour maps, projective/orthographic diagrams, multiple views of the same scene, single view where depth information can be inferred, and others. Further, object geometry can be decomposed into a number of building blocks, forming a composite object, and then embedded/projected into the image accordingly. Thus, when analyzing the geometric structure of objects, these and other techniques are considered. According to this embodiment, when analyzing an elevation map, Geometry Analysis software component 320 reads the corresponding elevation map image, and generates its Z-coordinates, according to the intensity of each image pixel. When analyzing a contour map, Geometry Analysis software component 320 extracts curves from the image, and then assigns Z-coordinates to the extracted curves, according to a predefined scale, based on interpolation of the distances between the curves. When analyzing an extrusion contour image, Geometry Analysis software component 320 extracts contours from the image, and then can calculate a skeleton (pixel x belongs to the skeleton of object O, if the center of a circle having radius τ, contained entirely within the object and tangent to the object boundary at two or more points, lies inside the pixel x). After that, Geometry Analysis software component 320 can assign corresponding Z-values to the skeleton and to the contour (e.g., maximal Z-value is assigned to the skeleton, and the minimal Z-value is assigned to the contour), and interpolates between them using a predefined smoothing function (e.g., a Gaussian, Logarithmic function, etc.).

Further, when analyzing a projective/orthographic projection sketch of a general 3D model, Geometry Analysis software component 320 analyzes the sketch details (lines, curves, corners, etc.), and then generates a connected graph (vertices and edges). It should be noted that according to an embodiment of the present invention, the image is analyzed for predefined cues that can help performing the sketch analysis (e.g., sketch position relative to a viewpoint, the main axis system that is used in the sketch). Also, some assumptions on the sketching can be made: for example, it can be assumed that the sketch is drawn in a general viewpoint that reveals as much 3D information as possible (e.g., in a wireframe model a viewpoint that reveals all edges and vertices). It should be also noted that the interpreted sketch does not have to reflect exactly the same as the drawn one. For example, classification of strokes to lines/conic curves, and the like, can be performed. Geometry Analysis software component 320 can decide to split a line (that has been previously determined as a continuous line), or introduce a new corner, or cancel a corner, etc. According to an embodiment of the present invention, the analysis of a sketch comprises one or more of the following: (a) analysis of primitives (e.g., lines, corners, and the like); (b) correlating the primitives to a single connected component (this may include filling gaps, caused by acquisition); (c) generating a connected graph corresponding to the sketch, wherein each corner is represented by a vertex, and lines/curves connecting the corners are represented by edges; (d) calculating 2D coordinates for the vertices of the connected graph, keeping the scale ratio of the 2D coordinates similar to their appearance in the image; (e) assigning weights to edges; for example, indicating their importance or the level of confidence of their extraction from the captured sketch; (f) improving the graph's consistency according to the visual language rules used when sketching the object (for example, in a parallel (or nearly parallel) sketch, two lines with a small deviation in the angle may be corrected to have the same angle); (g) reconstructing 3D models from the connected graph. This can be done, for example, by using a conventional heuristic technique used to reconstruct 3D interpretation from a connected graph. It should be noted that the original sketch is kept with the generated connected graph, so that after completing the sketch interpretation process, a user can recover how a specific edge (of the drawn figure) or a vertex was originally drawn in order to make the composited AR scene more similar to the original sketch.

Still further, when analyzing multiple views of the same scene, Geometry Analysis software component 320 analyzes these images to determine features that are corresponding in at least two of them: corresponding points, lines, shapes, corners, cues, and the like. It should be noted that at least a portion of such corresponding features can be embedded within the image at Embedding sub-stage 206 or Online Sketching stage 225, in turn enabling Geometry Analysis software component 320 to relatively robustly determine corresponding features in the above multiple views. By providing two or more views of the same scene and providing the corresponding features between them, it is possible to implement conventional methods that infer partial or complete 3D model of the scene, embedded in the multiple views. For example, if a statue is imaged from several points of view with some overlapping area, then at Embedding sub-stage 206 the images may be placed one next to another (all forming one larger image) with additional cues, added to those images, to allow the corresponding features between the images to be relatively robustly identifiable by means of Geometry Analysis software component 320. Then, at Extraction stage 320, the additional cues are analyzed along with existing cues in the image (e.g., corners, lines) to form the corresponding features. Finally, the 3D model of the statue can be generated for all views, according to the taken images, by using conventional techniques. Still for another example, an architectural plan may show a sketching of the same building floor from different view, such as a top view, side views, etc. Such sketching can be repeated for each building floor. Then, in Extraction sub-stage 212 (FIG. 3), based on a set of predefined architectural rules (visual language rules), the 3D model of the building or of its portions can be reconstructed. In turn, the corresponding 3D AR scene can be composited on the architectural plan or in a predefined location aside the architectural plan, according to one or more rules.

Further, it should be noted that when analyzing a sketch of a single view, where the data related to the object(s) depth can be inferred from the sketch, conventional techniques for obtaining a connected graph can be applied. For example, an engineering plan or architectural plan may be reconstructed (up to scale) at Extraction sub-stage 212. It should be noted that at least a portion of the object(s) depth information (e.g., a depth cue) can be embedded within the image at Embedding sub-stage 206 or Online Sketching stage 225, in turn enabling Geometry Analysis software component 320 to use this information. For example, the depth cue can be related to a building hiding other building, or separating one building from another. In turn, at Application Usage sub-stage 215 (FIG. 2A), the street can be augmented from different angles of view.

Also, it should be noted that according to an embodiment of the present invention, when performing an object geometry analysis by means of Geometry Analysis software component 320, it can be determined that the object extracted by Object Extractor 310 comprises two or more other objects. If so, these other objects can be analyzed separately. Thus, according to this embodiment, Geometry Analysis software component 320 can also extract objects from the image, in addition to Object Extractor 310.

Modeling Cues Analysis software component 335 analyzes the (modeling) cues that modify the geometry of an object, to which the cues are assigned. For example, a mirroring cue can cause turning the 2.5D geometry of an object into a symmetric 3D geometry. Furthermore, a modeling cue may change the object/cue texture. It should be noted that the geometry of an object can comprise its topological structure (e.g., a mesh) and may comprise additional properties, such as the location of the center of mass, the density of the object, the quaternion (descriptions of rotations in 3D space), and so on. Therefore, a modeling cue can be used, for example, to indicate the center of an 2D object.

Animation Analysis software component 340 analyzes the animation applied to an extracted object. It should be noted that object animation relates to a change during the AR application runtime in one or more object properties, such as texture, geometry, object location. For example, a cue in the image that defines a rule for changing object location can be a curve/line, which depicts an animation path, or can be an arrow, which depicts the object's trajectory. For another example, a rule for changing object texture can be defined by providing several images (e.g., in proximity to a main background image containing the object), illustrating the object in different key-frames (the object has different texture in each key frame); as a result, the animation can be morphing between the textures. In addition, changes in modeling cues or parameters of the cues can be provided by placing different cues in a timeline manner near the object to which they are related.

Space Warps Analysis software component 345 analyzes the space warps to be applied to one or more extracted objects within the composited AR scene. For example, the space warp can be wind, blowing on the objects within the AR scene, or it can be a gravitational/elastic force pulling the objects. Such space warps and any other properties can be assigned, by default, according to a predefined rule, or marked by annotations.

Physical Property Analysis software component 350 analyzes the physical properties of extracted objects (the physical properties can be length of an object, its mass, weight, density, and the like). As such, the image with the embedded AR content may be related to a physical system simulation related to the object location or elasticity, which are based on physical laws. For example, the image can present simulation of a body, connected to a spring and having a predefined weight (e.g., 1 kg), that slides down a hill inclined in 70 degrees. The forces applied to such a body can be marked by arrows, each indicating the direction of a force and its intensity (the intensity can be determined, for example, according to the length of the arrow). For another example, a ball (being an extracted object) can have a special marking, indicating its initial speed and acceleration. It should be noted that not only a specific object, but also an entire image can have predefined physical properties, which are applied to all objects within the scene, such as a gravitational force.

User Interaction Analysis software component 355 analyzes user interaction annotations to be applied to one or more extracted objects. Predefined interaction cues (e.g., a red, hand symbol) can be located near an object, indicating that a user can interact with the object (e.g., move/morph the object by means of predefined keyboard keys). Further the user may change the velocity of objects (e.g., racing cars) and make them move around.

Inter-Object Connection Analysis software component 360 analyzes inter-connected components within the image, according to some predefined settings. For example, it may analyze a rope wrapped around a wheel. For another example, it may analyze a box connected to a rope, or a man standing on the ground. A connection between objects indicates that transformations applying to one object may affect another object. For example, in a physical system simulation, if a spring is inter-connected with a box, then the box's mass affects the spring behavior.

Mesh Generation software component 325 generates a mesh for each extracted object for enabling further processing by means of Object Factory software component 365.

Mesh generation may use conventional techniques, such as triangulation along with the specific knowledge of the 3D model to be meshed (such as what kind of a model it is, manifold/non-manifold model, 2.5D model, symmetric model, etc.).

Texture Generation software component 330 generates texture for one or more extracted objects, as required (e.g., for correcting the texture). For example, portions of the image that are occluded by annotations (cues), objects, color squares, and the like, are filled-in using conventional in-painting techniques.

Object Factory software component 365 receives properties of each extracted object (e.g., the properties such as object geometry, texture, cues, animation paths), assigns to the each extracted object one or more corresponding rules, and outputs one or more reconstructed objects (models) ready to be registered and rendered at Application Usage stage 215 (FIG. 2A). For this, a set of cues is applied to the corresponding objects one after the other in a predefined order, according to a set of predefined rules. Usually, a geometry modifier (a modeling cue) is applied first, changing the generated mesh, which in turn allows texture binding to the final mesh in one of many possible styles (e.g., the texture can be stretched (scaled up/down), tiled, centered). Then, location and orientation in space can be also assigned to the object, which makes the one or more reconstructed objects (models) ready to be projected on the image and rendered for compositing an AR scene.

According to an embodiment of the present invention, the object can be augmented with reference to another object, binding two objects together by using a predefined rule (e.g., drawing a square around the two objects, drawing the two objects in a similar color) in a way related to a reference type. For example, if the reference is "location", then any change in location of the first object, will lead to the change in location of the second object. For another example, if the reference is "texture material", then changing the material of the first object will make the material of the second object to be changed accordingly.

It should be noted that according to an embodiment of the present invention, all units/components of the present invention can be implemented in software and, optionally, in hardware.

FIG. 4A is a sample map (image) 500 of a ski site, such as Saint Moritz ski site in Switzerland, comprising embedded AR content based on the presented In-Place Augmented Reality approach, according to an embodiment of the present invention. In addition, FIG. 4B is a corresponding AR scene 500' composite based on the map 500, according to this embodiment of the present invention. IPAR image 500 is a background image that defines terrain texture, while the terrain geometry is specified by elevation map 520, which is scaled down and placed as legend 505 near the image 500. Alternatively, elevation map 520 can be placed within the image 500, for example, on its top right corner. Skier 510 and bus 513 are embedded as icons within image 500, and they are surrounded by contours 511' and 511", respectively, which have a green color, for example. Curves (paths) 514' and 514" annotate animated routes of the skier 510 and bus 513, respectively, and the curves can have a red color, for example. When image 500 is captured (acquired) by means of a camera, the embedded AR content is extracted. Then, movements of skier 510 and bus 513 are animated on the paths 514' and 514", within the DEM terrain model, constructed on image 500, according to provided elevation map 520.

Figure 6A:
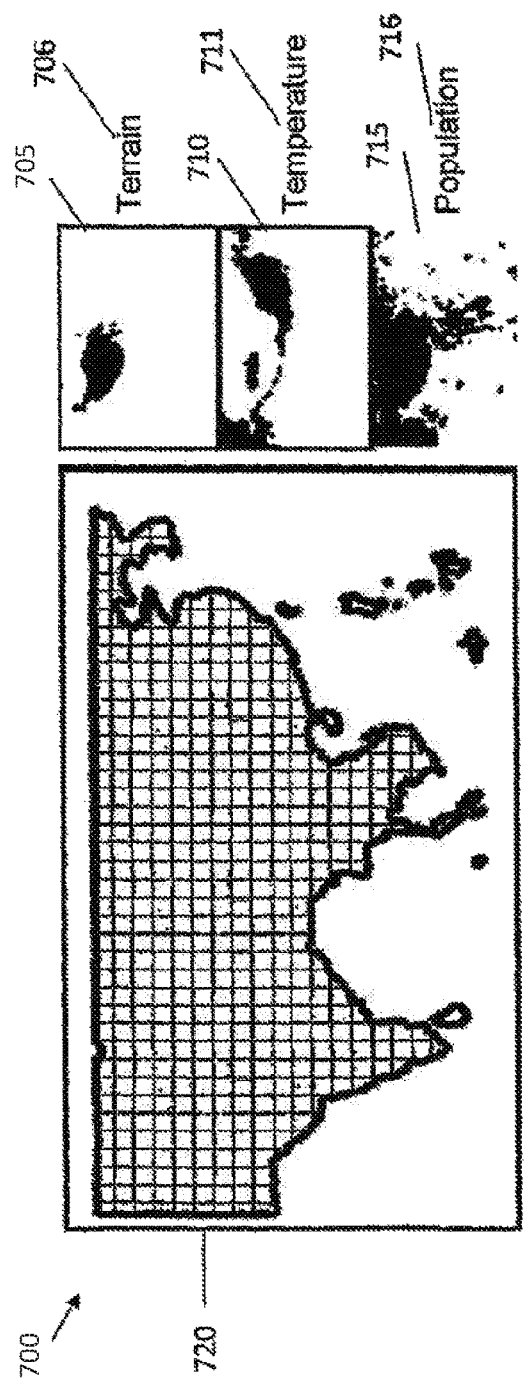
FIG. 6A demonstrates viewing geographic information, employing two or more layers, based on the presented In-Place Augmented Reality approach, according to an embodiment of the present invention.

It should be noted that in this example, skier 510 and bus 513 are objects that represent embedded virtual models; their corresponding contours 511' and 511", and animated paths 514' and 514" are embedded annotations (cues), defining the behaviors of the virtual models (both above virtual models, and their annotations are the embedded AR content of image 500). Legend 505 is used to specify some additional AR characteristics, such as mass (M) 515 (e.g., M=50 kg) of skier 510 in kilograms (kg), based on which the velocity of his movement down the mountain can be calculated and updated in each frame. IPAR system 200 (FIG. 2A) can determine this mass in legend 505 by employing conventional OCR (Optical Character Recognition) techniques looking for the sequence "M=_____ kg"). Further, elevation map 520 provided within the legend 505 enables displaying a terrain representation of Saint Moritz ski site to a user, so the user gets a real impression. For this purpose, elevation map 520 is stretched (scaled up/down) to fit the size of background image 500, assigning height to each pixel of the background image 500. Then, image 500 is corrected to be used as a texture: parts of image 500 that were occluded by annotations (cues), objects, and/or color squares (e.g., green contour) are filled-in using conventional in-painting techniques, such as the one disclosed by A. Teles, "An image in-painting technique based on the fast marching method," J. Graphics Tools, vol. 9, pp. 25-36, 2004. It should be noted that an original image, rather than the enhanced one (e.g., the color balancing can be performed for enhancing the image at Acquisition sub-stage 211) can be in-painted and used as texture, which gives a first approximation of the lighting conditions in the real-world scene, allowing the rendered content to fit into it more naturally. Also, various additional texture layers can be defined as well. These additional layers are also stretched to the size of background image 500 and superimposed, for example, as semi-transparent images/layers (e.g., as shown in FIG. 6A).

According to an embodiment of the present invention, animation paths are continuous curves/lines, having a predefined color/grey-level (e.g., a red color). To enable extracting the animation paths, conventional edge linking and thinning, can be performed. It should be noted that according to an embodiment of the present invention, the following animation analysis can be applied on background image 500 by means of Animation Analysis software component 340: a) red curves (animation paths) are thinned; b) X-axis and Y-axis values are generated in places within image 500, when the curves pass; and c) animation of skier 510 and bus 513 is generated for the above X-axis and Y-axis values (Z-axis values can be set to some predefined default values).

According to another embodiment of the present invention, annotations define physical properties for objects. For example, skier 510 can slide down the mountain according to the embedded gravity annotation (e.g., an arrow pointing down), drawn next to the skier 510, instead of providing animation path 514'.

It should be noted that for representing pixel colors, a conventional RGB (Red, Green, Blue) model can be used. Also, the intensity of green and red colors that are used to identify AR features can be amplified, while the intensity of the blue color van be reduced (since it is usually strongly amplified in common natural illumination conditions). Also, in order to deal with color distortion, it can be assumed that the intensity of each color drops independently and linearly with respect to the corners of the captured image. Hence, three reference color squares (e.g., one square is red 521, the second is blue 522 and the third is green 523) can be added to each corner of the image or can be located within legend

505 of the image. Then, after the image acquisition, each pixel color is corrected according to the interpolated brightness reduction of these reference color squares. As a result, the enhanced captured image can have uniform lighting conditions. It should be noted that acquisition of images by means of a camera can be performed by taking one or more still pictures or shooting a video clip. Also, it should be noted that reference colors can be used to identify similar colors within the acquired image. This allows, for example, placing several color references in a predefined location within the image (e.g., the location can be marked by a predefined symbol). Each color reference (e.g., yellow or orange) can be used to identify rules embedded in the image.

As indicated above, it should be noted that according to an embodiment of the present invention, the following rules can be applied to image 500 when embedding AR content into the image, when processing the embedded AR content, and when rendering the corresponding AR scene for a user: a) each object within the image has a green contour, enabling its relatively robust extraction from the image by means of Object Extractor 310 (FIG. 3); b) object cues that define object behaviors are marked in red (such as animation paths); c) the geometry of the main object (background image 500) is a DEM model, and the geometry of other objects is flat; d) animation cues are drawn as curves; e) the weight of skier object 510 is defined by the template "M=_____ kg", wherein M is the mass in kilograms of skier 510; f) legend 505 is drawn near image 500, providing additional data related to the image 500; g) within image 500, red and green colors are enhanced (amplified), while the blue color is reduced; and h) red, blue and green colors are provided within legend 505 as reference colors.

According to an embodiment of the present invention, Object Extractor 310 identifies legend 505 and background image 500 as separate entities. Further, reference colors 521, 522 and 523 provided within the legend 505 are sampled, and then red, blue and green colors within image 500 are identified accordingly. Then, objects are determined within the image by performing connected component analysis, according to predefined rules (identifying green contours 511' and 511"). Similarly, annotations are identified following their identifying feature defined in the rules (e.g., annotations are represented within the image by means of red pixels), and for each annotation connected component, a corresponding object connected component is determined and assigned, according to the distance between these two components (e.g., they have to be the closest connected components). According to another embodiment of the present invention, annotations can be assigned to objects according to other predefined rules (such as their color, size, texture and many others). Each cue/annotation that appears in legend 505 (being a legend pointer) is searched within image 500, and if found, it is correlated with the corresponding object/cue within the image. It should be noted that the legend pointer can be either identical to an object drawn within image 500 or can be a cue that appears near the object. In addition, background image 500 is considered to be an object by itself, and the elevation map 520 geometry is assigned to it.

It should be noted that according to still another embodiment of the present invention, if a book (e.g., a world atlas) is provided with a plurality of IPAR images, such as image 500, it can help pupils (users) study material (e.g., geography) in an efficient and interesting way. Also, users can interactively change image properties, such as animated paths on the DEM terrain model constructed on image 500, and they can perform other interactive operations with the IPAR images, such as add additional skiers 510 and/or buses 513. Thus, IPAR images can be used for a variety of purposes.

FIG. 5A is a sample image 600 of an interactive ocean artwork, based on the presented In-Place Augmented Reality approach, according to an embodiment of the present invention. In addition, FIG. 5B is a corresponding AR scene 600' composited based on the image 600, according to an embodiment of the present invention. According to this embodiment, annotations on the image can also be used to define user interaction. A boat object 610 is annotated for user-interaction by placing a red hand annotation 612 near the boat object 610. Red hand 612 means that the user can move boat 610 by using the keyboard/keypad keys of a device (e.g., a cellular phone, computer, television and the like), on which AR scene 600' is observed). It should be noted that modeling cues that modify the geometry of objects within image 600, can also be assigned by annotations. For example, a property of sea model 620 is specified by a wave modeling cue 615. The height and frequency of wave cue 615, can be used to specify properties of the virtual wave model, according to a number of predefined rules: thus, the higher an amplitude of the drawn wave 615 is, the wavier is the sea 620 becomes, when viewed by a user at Application Usage stage 215 (FIG. 2A). I.e., wave cue 615 modifies the flat geometry of sea 620 in a sinusoidal manner over time, which causes sea 620 to be wavy.

According to an embodiment of the present invention, extraction of objects embedded into image 600, such as hand 612, boat 610 and sea 620, can be performed based on their colors. For example, hand 612 is red, boat 610 is yellow and sea 620 is blue. It should be noted that wind cue 605, which is drawn in the left top corner of image 600, is applied to all objects within image 600, and wave cue 615 is applied only to sea 620, on which it is drawn. All these settings can be customized by the creator/designer of image 600 by using visual language rules. It should be noted that the wind force is applied to the entire image 600 as an overall image space warp. Also, texture in-painting is applied to portions of image 600 that are occluded by boat 610, wind 605 and wave 615 cues. As a result, these portions are filled-in using conventional in-painting techniques.

Figure 6B:
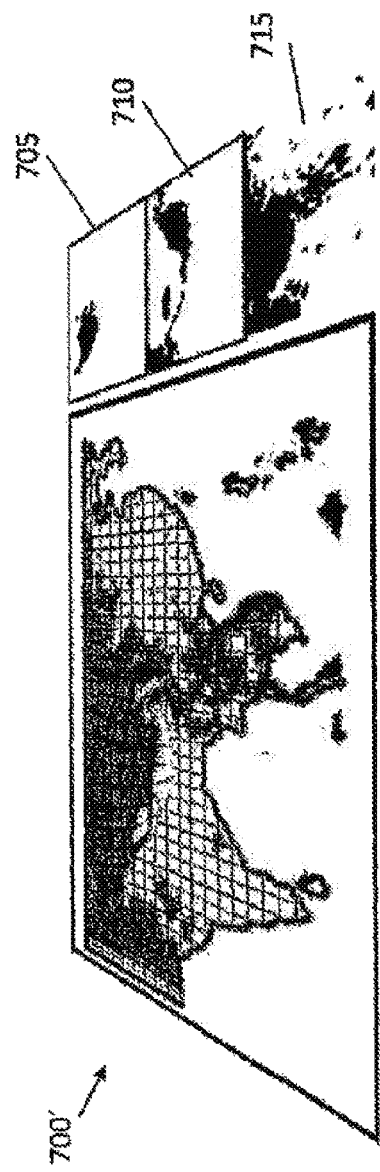
FIG. 6B is a corresponding AR scene composited by combining geographic layers, according to an embodiment of the present invention.

FIG. 6A demonstrates viewing geographic information 700, employing two or more layers (such as layers 720, 705, 710, and 715, based on the presented In-Place Augmented Reality approach, according to an embodiment of the present invention. In addition, FIG. 6B is a corresponding AR scene 700' composited, for example, by combining the layers 720 and 705, according to an embodiment of the present invention. According to this embodiment, layer 720 that is a world view as seen from outside the atmosphere, is a background image, on which one or more other layers (images) 705, 710 and 715 can be presented by means of IPAR system 200 (FIG. 2C), each layer providing a different type of information about the world: layer 705 is a terrain elevation image; layer 710 is a temperature image; and layer 715 is a population density image. The one or more layers can be presented, for example, in a semitransparent way on the background image 720, according to a user's request, giving rise to an IPAR image with the embedded AR content (which is one or more of the layers 705, 710 and 715). Thus, when displaying the IPAR image to a user by means of AR application (e.g., installed on his mobile device) at Application Usage stage 215 (FIG. 2C), the terrain elevation image 705 can be virtually elevated, demonstrating relative elevation heights), according to the Digital Elevation Model (DEM).

According to an embodiment of the present invention, at Acquisition sub-stage 211 (FIG. 2C) each of layers 720, 705, 710 and 715 is first extracted. Layers 705, 710 and 715 can be identified, respectively, by analyzing its corresponding annotation—"Terrain" 706 for defining background image 720 geometry, "Temperature" 711 and "Population" 716 layers for defining additional background image 720 textures. Then, a flat model of background image 720, as the texture, is generated. Each of other layers 705, 710 and 715 is extracted and stretched to the size of the background image. It is also associated with user interaction, allowing keyboard keys to enable a user to add/remove one or more of them onto/from the background image 720. During Rendering sub-stage 217 (FIG. 2C), pressing one of the keyboard keys toggles the visibility of each corresponding layer. For example, when a geometry layer (terrain elevation layer 705) is toggled on, the flat model of image 720 is replaced with the corresponding elevated terrain. When another texture layer (either temperature layer 710 or population density layer 715) is toggled on, it is added to the other visible texture layers. The result allows the user to see in runtime a semi-transparent overlay of any possible combination of the layers. This way, users can find the correlation between higher places, colder temperatures, and sparser population, toggling different layers on and off. The users are thus provided with the ability to view several layers of the same geographic region.

Figure 7A:
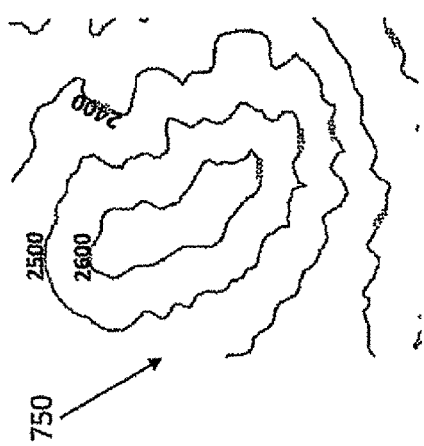
FIG. 7A is a sample contour map sketch to be rendered and displayed as a 3D AR scene, based on the presented In-Place Augmented Reality approach, according to an embodiment of the present invention.

FIG. 7A is a sample contour map image (sketch) 750 to be rendered and displayed as a 3D AR scene, based on the presented In-Place Augmented Reality approach, according to an embodiment of the present invention. When analyzing contour map 750 by means of IPAR system 200 (FIG. 2C) (more particularly, by means of Geometry Analysis software component 320 (FIG. 3)), the curves are extracted from the contour map 750, and then corresponding Z-coordinates are assigned to the extracted curves, according to the height levels indicated near them (e.g., 2600 (meters), 2500 (meters), etc.), or according to an arbitrary scale. As a result, a corresponding 3D AR scene is composited at Application Usage stage 215 (FIG. 2C). It should be noted that according to this embodiment, Embedding sub-stage 206 (FIG. 2A) is not required, and IPAR system 200 uses contour map image 750, as an existing image 230, according to FIG. 2C. In addition, portions of image 750 that are occluded by annotations (cues), e.g., the height levels, may be filled-in by using conventional in-painting techniques. It should be noted that contour map image 750 can be sketched by hand or by means of computer software (e.g., Microsoft® Paint), giving rise to a computer-generated image (sketch).

Figure 7B:
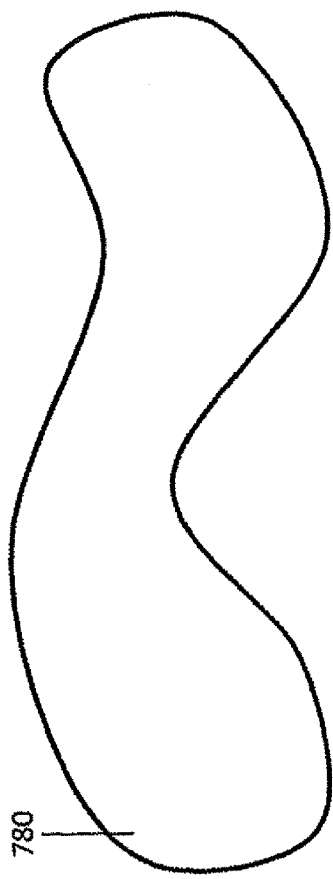
FIG. 7B is another sample sketch to be rendered and displayed as a 3D AR scene, based on the presented In-Place Augmented Reality approach, according to an embodiment of the present invention.

FIG. 7B is another sample sketch 780 to be rendered and displayed as a 3D AR scene, based on the presented In-Place Augmented Reality approach, according to an embodiment of the present invention. According to this embodiment, sketch 780 illustrates a closed (grayscale) curve to be displayed as a 3D hill in AR scene. First, the user sketches 2D closed curve 780 at Online Sketching stage 225 (FIG. 2B). Then, the sketch can be acquired using a conventional cellular phone camera, and the closed curve is identified as a main single object within the sketch (in this particular example) at Content Retrieval stage 210 (FIG. 2B). Afterwards, at Application Usage stage 215 (FIG. 2B), the extracted closed curve object is registered and rendered by means of AR application, and then the corresponding 3D AR scene is displayed to the user on the same place—over the 2D sketch. It should be noted that the AR application can decide what to do with closed curve 780 (e.g., to interpret it as a 3D hill), according to one or more predefined rules provided within the sketch 780. For example, the grayscale solid texture of the closed curve can be interpreted by means of the AR application as an intention of the user to view a 3D scene of a hill. On the other hand, providing an orange color solid texture of the closed curve can be interpreted, for example, as an intention of the user to view a 3D scene of a valley.

Figure 8:
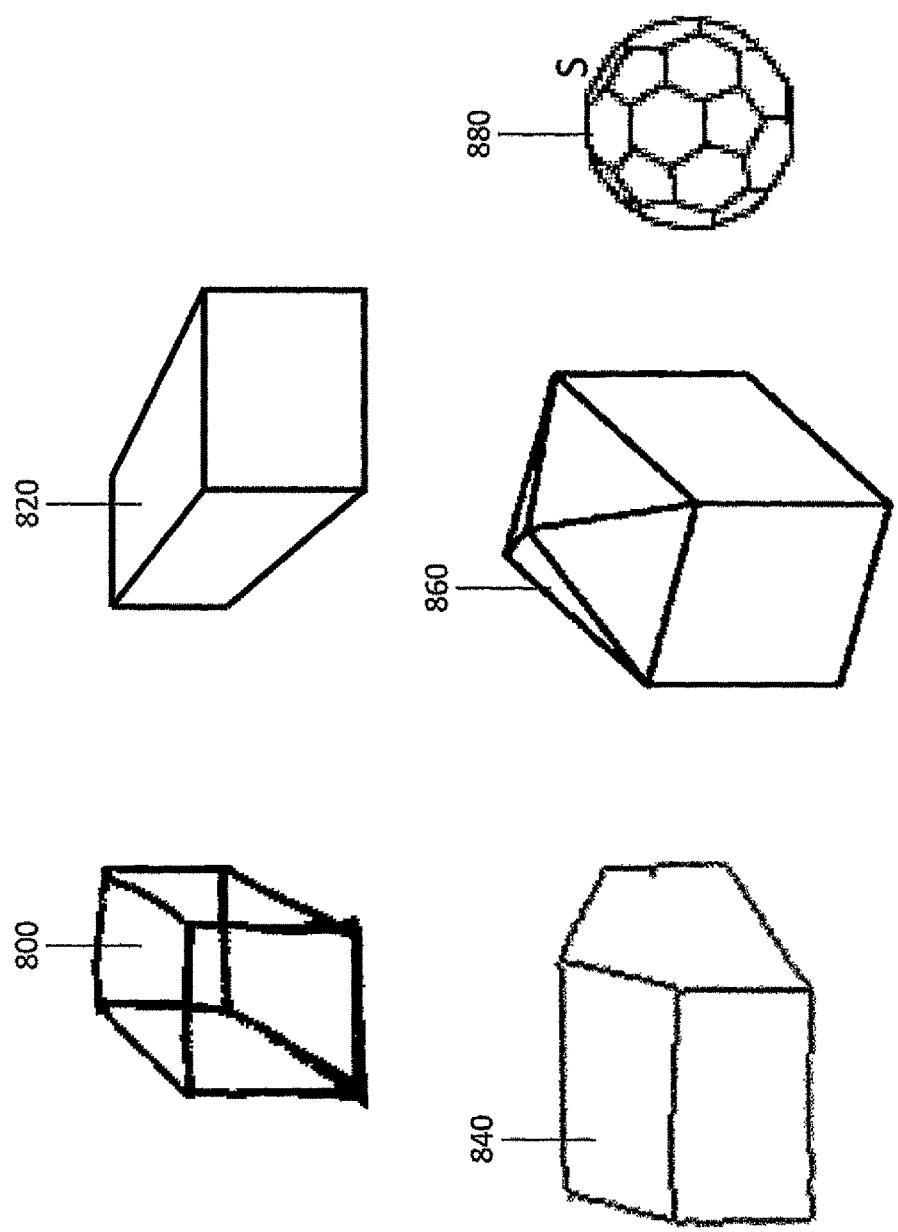
FIG. 8 illustrates other sample sketches to be composited, for example, in a single 3D AR scene based on the presented In-Place Augmented Reality approach, according to an embodiment of the present invention.

FIG. 8 illustrates other sample sketches 800, 820, 840, 860 and 880 to be composited in AR scene, based on the presented In-Place Augmented Reality approach, according to an embodiment of the present invention. These sketches can be acquired by a single imaging device (e.g., a cellular phone camera) during Online Sketching sub-stage 225 (FIG. 2B), and then a single 3D AR scene or different 3D AR scenes can be composited at Content Retrieval sub-stage 210 (FIG. 2B). In addition, composing more sketches may lead to obtaining a more complex virtual model. According to this embodiment of the present invention, at Extraction sub-stage 212 (FIG. 2B) each of the sketches forms an object, according to an objectification predefined rule, where each connected component is an object. If an annotation is placed in proximity to a connected component (object), it is correlated with the object (e.g., the symbol S near sketch 880). Then, Geometry Analysis software component 320 (FIG. 3) analyzes the sketch and generates a connected (weighted) graph with coordinates on its vertices, according to an embodiment of the present invention. It should be noted that the 3D geometry of the sketch can be interpreted by using conventional heuristic techniques. In sketch 880, the annotation "S" (symmetric) is an object modifier (modeling cue) defined by a predefined rule and assigned to the ball 880, thereby instructing the AR application to modify the ball geometry to make it symmetric. For this, conventional techniques for inferring the 2.5D geometry of the ball are applied, and then this geometry is mirrored, enabling displaying a corresponding AR scene of the symmetric 3D ball to a user. It should be noted that sketches 800, 820, 840, 860, and 880 illustrate a different line-sketching techniques, each representing a projection of a 3D model: sketch 800 is a wireframe orthographic hand-drawn sketch with no hidden lines; sketch 820 is another hand-drawn sketch, wherein hidden lines are removed (a natural line drawing perspective sketch); sketch 840 is an additional hand-drawn sketch, wherein hidden lines are also removed; sketch 860 is a computer-generated sketch, where hidden lines are removed; and sketch 880 is a further sketch with removed hidden lines (cue "S" (Symmetric) is located near a ball drawn on this sketch, indicating that a symmetric ball will be generated in a composited AR scene). It should be noted that many other types of geometries may be interpreted by IPAR system 200 (FIG. 2B), including: objects with genus higher than zero, geometries with/without holes, and so on.

Figure 9B:
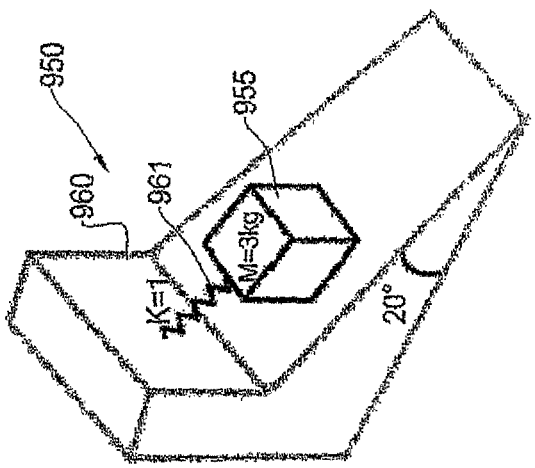
FIG. 9B is another sample illustration of another sketch of a physical system, from which a corresponding AR scene is to be composited, based on the presented In-Place Augmented Reality approach, according to an embodiment of the present invention.
Figure 9A:
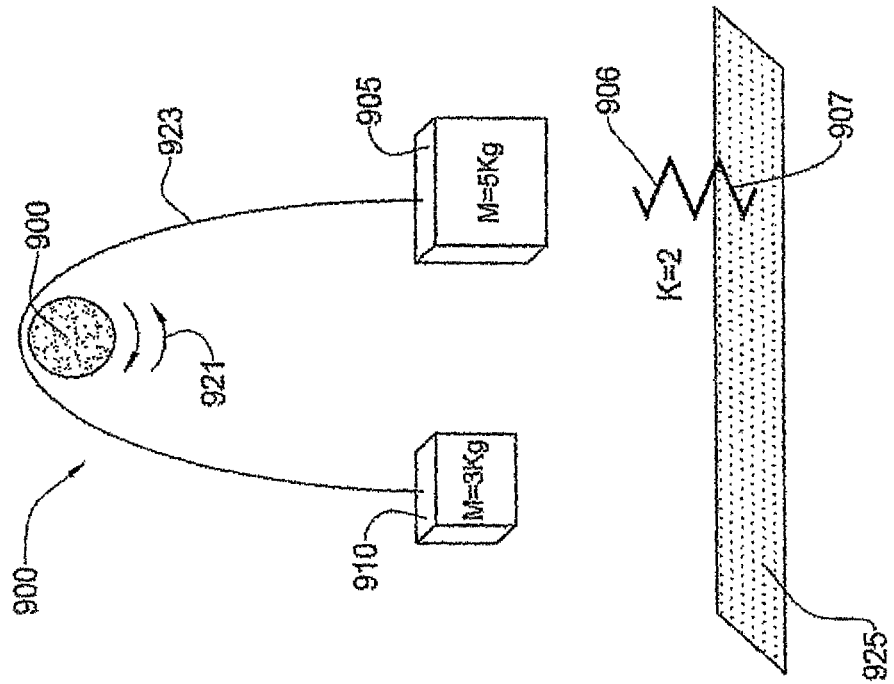
FIG. 9A is a sample illustration of a sketch of a physical system, from which a corresponding AR scene is to be composited, based on the presented In-Place Augmented Reality approach, according to an embodiment of the present invention.

FIG. 9A is a sample sketch 900 of a physical system, from which a corresponding AR scene is to be composited based on the presented In-Place Augmented Reality approach, according to an embodiment of the present invention. The sample physical system, as presented in this illustration, comprises a big box 905 connected to a small box 910 by means of rope 923, which passes over a wheel 920. The wheel can turn in clockwise or anti-clockwise manner, according to cue 921 indicated near the wheel 920. Thus, the boxes can move up and down accordingly. The mass of each box is indicated on each of them by means of an annotation, according to a predefined template "M=_____ kg" so the weight of large box 905 is 5 kg, and the weight of small box 910 is 3 kg. It should be noted that annotations of boxes 905 and 910 can be analyzed by means of Physical Property Analysis software component 350 (FIG. 3) at Extraction sub-stage 212 by using conventional template matching techniques, or conventional OCR techniques. Further, object 906 represents a spring, whose elastic coefficient K is set to "2" (annotation K=2 is provided near spring 906). Spring 906 is connected to a fixed surface 925 at its lower end 907. It should be noted that the surface 925 can be set and determined as fixed, by providing it with dotted texture. Thus, in the corresponding composited AR scene, when large box 905 falls on spring 906, it bounces back due to the elastic force of the spring 906. It should be noted that Inter-object. Connection Analysis software component 360 (FIG. 3) analyzes the corresponding features of connected components provided within sketch 900: e.g., boxes, a rope and wheel, as well as the corresponding features of spring 906 and fixed surface 925.

FIG. 9B is another sample sketch 950 of another physical system, from which a corresponding AR scene is to be composited based on the presented In-Place Augmented Reality approach, according to an embodiment of the present invention. In this illustration, box 955 is located on stand 960, which is inclined by 20° (20 degrees), as annotated in this illustration. Box 955 is connected to the stand 960 by means of spring 961. In turn, spring 961 has an annotation of elastic coefficient K equal to "1". Thus, in the corresponding generated AR scene, when box 955 slips downwards stand 960 due to the gravitational force, it is pulled back by means of the spring 961. It should be noted that since the gravitational force is not indicated in the sketch (there is such annotation in sketch 950), then the gravitational force can be set to some default value, according to a predefined rule.

Figure 10:
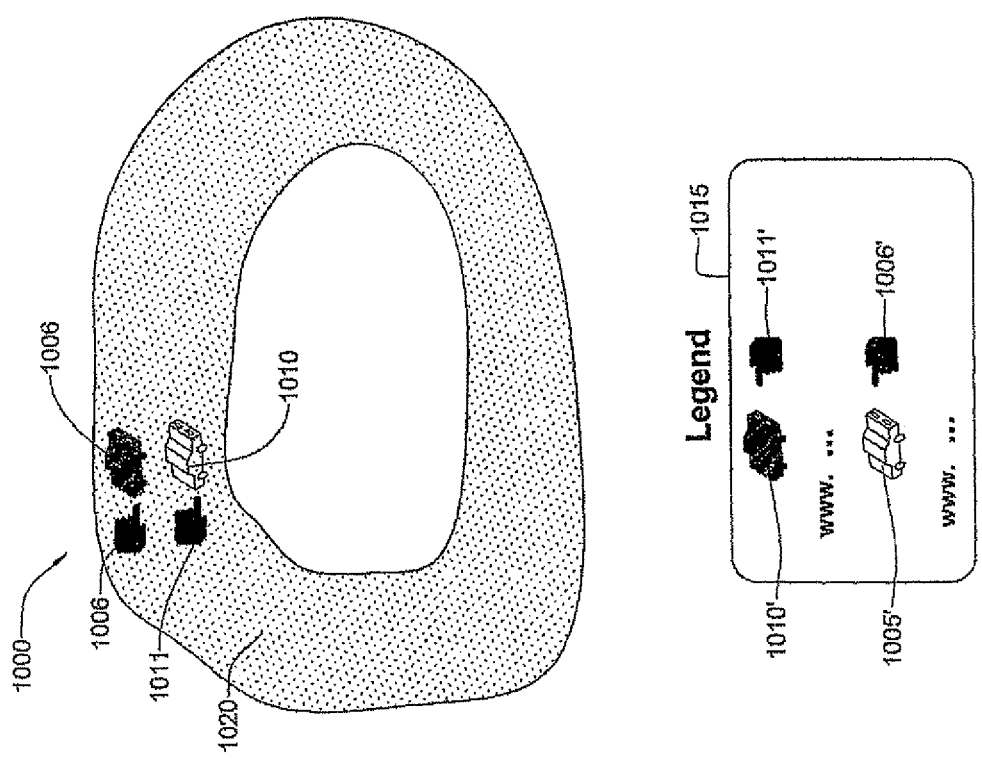
FIG. 10 is still another sample image representing a car racing game, based on the presented In-Place Augmented Reality approach, according to an embodiment of the present invention.

FIG. 10 is still another sample sketch 1000 representing a car racing game based on the presented In-Place Augmented Reality approach, according to an embodiment of the present invention. Image 1000 contains racing ground 1020 and two racing cars 1005 and 1010. Also, two hands 1006 and 1011 are drawn on the image 1000, each assigned to its corresponding car 1005 and 1010, respectively, implying that users can interact with the cars, thereby enabling controlling these cars by means of keyboard arrows, for example.

According to an embodiment of the present invention, image 1000 can be acquired by two users by using, for example, their mobile devices. Bach user can control his car by means of dedicated AR application, installed on his mobile device. Further, the AR application may enable users to communicate one with another (allowing additional user interaction) by using conventional data transmission means, such as Bluetooth®. According to an embodiment of the present invention, legend 1015 can be provided near image 1000, containing some additional information, such as links for downloading pictures/models of racing cars over a data network (e.g., a cellular network). Thus, in legend 1015, near annotation 1010' of a first car, a link for downloading the corresponding car 1010 picture is provided and, similarly, near annotation 1005' of a second car, a link is provided for downloading the corresponding car 1005 picture.

It should be noted that according to an embodiment of the present invention, only part of the objects within image (stretch) 1000 are extracted from image 1000 itself, while other objects (e.g., annotated by using pictures of cars 1005 and 1010) are downloaded (conveyed) from a remote database/library (or a local file) by following links that point to where they are stored. The downloaded objects may include of geometry, texture and some default behaviors or properties, such as mass, default animation, etc. Furthermore, the downloaded object, such as car 1005 or 1010, interacts with racing ground object 1020 relatively seamlessly according to a set of predefined rules, as if the downloaded object has been extracted from image 1000 itself. This is achieved by providing corresponding annotations 1006 and 1011 within image 1000, which are spatially located within image 1000 on racing ground 1020, according to a set of predefined rules. This means, for example, that placing annotation 1006 or 1011 somewhere else within sketch 1000 will place there a downloaded car object, thereby enabling the user to interact with sketch 1000 and edit the sketch content, while embedding the content provided from a remote database, for example. It should be noted the link for downloading a car picture can be a path to a file, an index, a URL (Uniform Resource Locator), or to any other resource.

Figure 11:
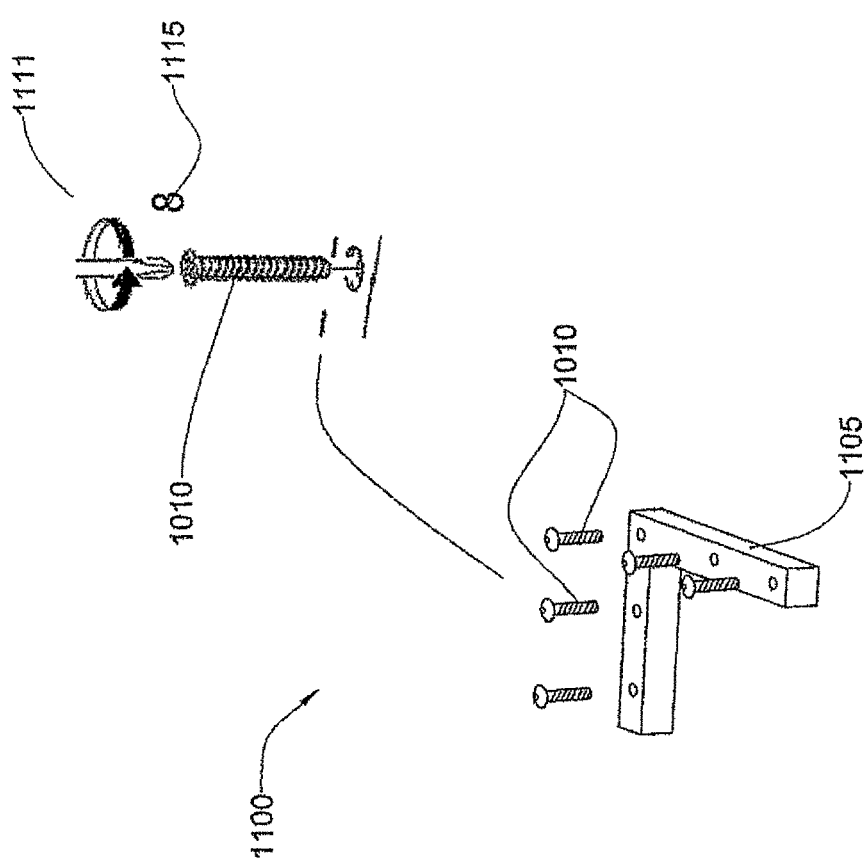
FIG. 11 is an additional sample image comprising embedded AR content of assembly instructions to be displayed in a 3D AR scene based on the presented In-Place Augmented Reality approach, according to an embodiment of the present invention.

FIG. 11 is an additional sample image 1100 comprising embedded AR content for assembly instructions to be displayed in a 3D AR scene, based on the presented In-Place Augmented Reality approach, according to an embodiment of the present invention. According to this embodiment, 2D image 1100 contains visual instructions for assembling a piece of furniture 1105 (e.g., a kitchen table, closet) to be displayed to a user in a 3D AR seem. For this, image 1100 is provided with corresponding annotations, according to a set of predefined rules. For example, annotation 1111 is interpreted by IPAR system 200 (FIG. 2A) such that each screw 1110 should be turned clockwise, when assembling the piece of furniture 1105; another annotation 1115 "8" indicates that eight screws are provided for assembling the piece of furniture 1105. It should be noted that Object Extractor software component 310 (FIG. 3) can differentiate between piece of furniture 1105 and annotations 1110, 1111, and 1115. Piece of furniture 1105 is a perspective projection of a 3D model that is interpreted by means of Geometry Analysis software component 320 (FIG. 3). According to an embodiment of the present invention, Annotations 1110, 1111, and 1115 are analyzed by means of Animation Analysis software component 340 (FIG. 3), and the composited 3D scene can be generated by means of Object Factory software component 365 (FIG. 3). As a result, a corresponding 3D AR scene can present assembly instructions for assembling the piece of furniture 1105 in the 3D environment, as displayed to the user at Application Usage stage 215 (FIG. 2B). The assembly instructions may include, for example, displaying a piece of furniture 1105 from different views, or displaying animation to a user for demonstrating screwing of screws 1010, etc.

FIGS. 12A to 12C are sample sketches of multiple views of an architectural building plan, comprising embedded AR content be displayed in a 3D AR scene, based on the presented In-Place Augmented Reality approach, according to an embodiment of the present invention. According to this embodiment, FIG. 12A is a Top View 1200 of the building (containing sofa 1225, table 1230, windows 1220, door 1235), FIG. 12B is a West View 1201 of the building and FIG. 12C is an East View 1202 of the building. Each type of view (top, west and east views) can be identified by determining and analyzing annotations 1205 to 1207. Further, compass 1215 provided within image 1200 can indicate a geographic direction (such as a North direction), according to which the corresponding AR scene can be composited, based on the multiple views. Also, each image 1200 to 1202 can comprise scale annotation 1210 to 1212, respectively, for enabling compositing the AR scene according to a desired scale. As it seen from FIGS. 12A to 12C, each scale annotation 1210 to 1212 has different length, although being related to the same distance (e.g., 2 m (meters)).

It should be noted that at Extraction sub-stage 212 (FIG. 2B), each view is identified as a different connected component. Also, annotations (such as 1205 to 1207) can be analyzed by using conventional OCR techniques. Top View image 1200 is used to reconstruct (by means of Geometry Analysis software component 320 (FIG. 3)) a flat model of the building, and additional building views are placed accordingly to composite a 3D AR scene of the building.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

What is claimed is:

1. A system for compositing an augmented reality (AR) scene, the system comprising:
   (a) an extraction component, operationally connected to a sensing device for capturing a real-world image, to:
   (i) extract an object from said real-world image into a memory of a data-processing machine, wherein the object defines how to geometrically construct a virtual model of the object according to a predefined rule set;
   (ii) geometrically construct the virtual model from said object, wherein geometrically constructing the virtual model comprises generating a geometry and texture of the virtual model based on an interpretation of the extracted object according to the predefined rule set, and wherein geometrically constructing the virtual model comprises modifying a property of the virtual model, such that an appearance or behavior of the virtual model upon rendering is different from a corresponding appearance or behavior of the object in the real-world image; and
   (iii) composite AR content from said constructed virtual model in order to augment said AR content on said real-world image, thereby creating the AR scene.

2. The system of claim 1, wherein said extraction component further:
   (iv) extracts at least one annotation from said real-world image into said memory of said data-processing machine for modifying the appearance or behavior of said virtual model in said real-world image according to at least one annotation.

3. The system of claim 1, wherein geometrically constructing the virtual model is performed independently of a predefined content or a pre-existing virtual model.

4. The system of claim 1, wherein said real-world image includes at least one image type selected from the group consisting of: a printed image, a hand-sketched image, a hand-drawn image, a sprayed image, an image displayed on a screen, an image projected on a surface, a weaved image, a carved-surface image, and an engraved-surface image.

5. The system of claim 1, wherein said real-world image includes at least two correlated annotations for modifying an effect of other annotations.

6. The system of claim 2, wherein said real-world image includes a legend comprising said annotation.

7. The system of claim 1, wherein said object includes the entirety of said real-world image.

8. The system of claim 1, wherein said extraction component includes at least one functional component selected from the group consisting of: an object-extractor component, a geometry-analysis component, a modeling-cues-analysis component, an animation-analysis component, a space-warp-analysis component, a physical-property-analysis component, a user-interaction-analysis component, an inter-object-connection-analysis component, a mesh-generation component, a texture-generation component, and an object-factory component.

9. The system of claim 1, wherein said extraction component further (iv) interacts with the AR scene by modifying said AR content based on modification of said object and/or at least one annotation in said real-world image.

10. A method for compositing an augmented reality (AR) scene, the method comprising the steps of:
    (a) extracting, by an extraction component into a memory of a data-processing machine, an object from a real-world image detected by a sensing device, wherein the object defines how to geometrically construct a virtual model of the object according to a predefined rule set;
    (b) geometrically constructing the virtual model from said object, wherein geometrically constructing the virtual model comprises generating the geometry and texture of the virtual model based on an interpretation of the extracted object according to the predefined rule set, and wherein geometrically constructing the virtual model comprises modifying a property of the virtual model, such that an appearance or behavior of the virtual model upon rendering is different from a corresponding appearance or behavior of the object in the real-world image; and
    (c) compositing AR content from said reconstructed virtual model in order to augment said AR content on said real-world image, thereby creating the AR scene.

11. The method of claim 10, the method further comprising the step of:
    (d) extracting at least one annotation from said real-world image into said memory of said data-processing machine for modifying the appearance or behavior of said virtual model in said real-world image according to at least one annotation.

12. The method of claim 10, wherein said step of geometrically constructing the virtual model is performed independently of a predefined content or a pre-existing virtual model.

13. The method of claim 11, wherein said real-world image includes a legend comprising said annotation.

14. The method of claim 10, the method further comprising the step of:
    (d) interacting with the AR scene by modifying said AR content based on modification of said object and/or at least one annotation in said real-world image.

15. A non-transitory computer-readable storage medium having computer-readable code embodied on the computer-readable storage medium, the computer-readable code comprising:
    (a) program code for extracting, by an extraction component into a memory of a data-processing machine, an object from a real-world image detected by a sensing device, wherein the object defines how to geometrically construct a virtual model of the object according to a predefined rule set;
    (b) program code for-geometrically constructing the virtual model from said object, wherein geometrically constructing the virtual model comprises generating the geometry and texture of the virtual model based on an interpretation of the extracted object according to the predefined rule set, and wherein geometrically constructing the virtual model comprises modifying a property of the virtual model, such that an appearance or behavior of the virtual model upon rendering is different from a corresponding appearance or behavior of the object in the real-world image; and (c) program code for compositing AR content from said constructed virtual model in order to augment said AR content on said real-world image, thereby creating the AR scene.

16. A system for compositing an augmented reality (AR) scene, the system comprising:
   (a) an extraction component, operationally connected to a sensing device for capturing a real-world image, to:
      (i) extract at least one object from said real-world image into a memory of a data-processing machine, wherein the at least one object defines how to geometrically construct at least one virtual model and information relating to a behavior associated with the at least one virtual model according to a predefined rule set;
      (ii) geometrically construct the at least one virtual model from said at least one object and from the information relating to a behavior associated with the at least one virtual model, wherein geometrically constructing the virtual model comprises generating the geometry and texture of the virtual model based on an interpretation of the extracted object according to the one or more predefined rules; and
      (iii) composite AR content from said at least one constructed virtual model in order to augment said AR content on said real-world image, thereby creating the AR scene.

17. A method for compositing an augmented reality (AR) scene, the method comprising the steps of:
   (a) extracting, by an extraction component into a memory of a data-processing machine, at least one object from a real-world image detected by a sensing device, wherein the at least one object defines, according to a predefined rules set, how to geometrically construct at least one virtual model and information relating to a behavior associated with the at least one virtual model;
   (b) geometrically constructing the at least one virtual model from said at least one object and the information relating to a behavior associated with the at least one virtual model, wherein geometrically constructing the virtual model comprises generating the geometry and texture of the virtual model based on an interpretation of the extracted object according to the predefined rule set; and
   (c) compositing AR content from said at least one constructed virtual model in order to augment said AR content on said real-world image, thereby creating the AR scene.

18. The system of claim 1, wherein the behavior comprises a change in the geometry or location of the object in the real-world image.

19. The method of claim 10, wherein the behavior comprises a change in the geometry or location of the object in the real-world image.

20. The system of claim 1, wherein the appearance or behavior of the virtual model comprises a user-interaction to be applied to the virtual model in an animated simulation of the virtual model, a physical force or property to be applied to the virtual model in an animated simulation of the virtual model, a geometry modification to be applied to the virtual model in an animated simulation of the virtual model, or an animated texture to be applied to the virtual model in an animated simulation of the virtual model.

21. The method of claim 10, wherein the appearance or behavior of the virtual model comprises a user-interaction to be applied to the virtual model in an animated simulation of the virtual model, a physical force or property to be applied to the virtual model in an animated simulation of the virtual model, a geometry modification to be applied to the virtual model in an animated simulation of the virtual model, or an animated texture to be applied to the virtual model in an animated simulation of the virtual model.

22. The non-transitory computer-readable storage medium of claim 15, wherein the appearance or behavior of the virtual model comprises a user-interaction to be applied to the virtual model in an animated simulation of the virtual model, a physical force or property to be applied to the virtual model in an animated simulation of the virtual model, a geometry modification to be applied to the virtual model in an animated simulation of the virtual model, or an animated texture to be applied to the virtual model in an animated simulation of the virtual model.

23. The system of claim 1, wherein, compositing the AR content comprises rendering the virtual model in substantially the same place as the object in the real-world image.

24. The method of claim 10, wherein compositing the AR content comprises rendering the virtual model in substantially the same place as the object in the real-world image.

25. The non-transitory computer-readable medium of claim 15, wherein compositing the AR content comprises rendering the virtual model in substantially the same place as the object in the real-world image.

26. The system of claim 1, wherein the object or the virtual model is not a physical or virtual representation of a person.

27. The method of claim 10, wherein the object or the virtual model is not a physical or virtual representation of a person.

28. The non-transitory computer-readable medium of claim 15, wherein the object or the virtual model is not a physical or virtual representation of a person.

29. The system of claim 1, wherein geometrically constructing the virtual model comprises generating the geometry and texture of the virtual model based on the extracted object geometry.

30. The system of claim 1, wherein the virtual model is not defined in advance by the predefined rule set.

31. The system of claim 1, wherein the extraction component additionally extracts the object from the real-world image according to the predefined rule set.

32. The method of claim 10, wherein geometrically constructing the virtual model comprises generating the geometry and texture of the virtual model based on the extracted object geometry.

33. The method of claim 10, wherein the virtual model is not defined in advance by the predefined rule set.

34. The method of claim 10, wherein the object is additionally extracted from the real-world image according to the predefined rule set.

35. The non-transitory computer-readable storage medium of claim 15, wherein the program code for geometrically constructing the virtual model comprises program code for generating the geometry and texture of the virtual model based on the extracted object geometry.

36. The non-transitory computer-readable storage medium of claim 15, wherein the virtual model is not defined in advance by the predefined rule set.

37. The non-transitory computer-readable storage medium of claim 15, wherein the program code for extracting the object from the real-world image comprises code for additionally performing the extraction according to the predefined rule set.

* * * * *

UNITED STATES PATENT AND TRADEMARK OFFICE
CERTIFICATE OF CORRECTION

| | | |
|---|---|---|
| PATENT NO. | : 9,824,495 B2 | |
| APPLICATION NO. | : 13/063724 | |
| DATED | : November 21, 2017 | |
| INVENTOR(S) | : Netanel Hagbi et al. | |

It is certified that error appears in the above-identified patent and that said Letters Patent is hereby corrected as shown below:

In the Claims

Claim 10, at Column 30, Line 29 - replace "reconstructed" with -- constructed --

Signed and Sealed this
Seventh Day of March, 2023

Katherine Kelly Vidal
*Director of the United States Patent and Trademark Office*